(12) United States Patent
Gomez Acevedo

(10) Patent No.: US 8,732,970 B2
(45) Date of Patent: May 27, 2014

(54) DEVICE FOR DEFINING AN ANGLE, ASSOCIATED METHODS, AND METHODS FOR DEFINING ANGULAR PROPERTIES OF OBJECTS

(76) Inventor: Hector Humberto Gomez Acevedo, Mexico City (MX)

( * ) Notice: Subject to any disclaimer, the term of this patent is extended or adjusted under 35 U.S.C. 154(b) by 179 days.

(21) Appl. No.: 13/439,903

(22) Filed: Apr. 5, 2012

(65) Prior Publication Data

US 2013/0263458 A1    Oct. 10, 2013

(51) Int. Cl.
*G01B 21/22* (2006.01)
*G01C 9/24* (2006.01)

(52) U.S. Cl.
USPC .................................. 33/390; 33/268; 33/1 N

(58) Field of Classification Search
USPC ............................................ 33/390, 268, 1 N
See application file for complete search history.

(56) References Cited

U.S. PATENT DOCUMENTS

| | | | | |
|---|---|---|---|---|
| 1,361,367 A * | 12/1920 | Coxey | ............................... | 33/351 |
| 1,479,024 A * | 1/1924 | Booraem | ......................... | 33/377 |
| 1,820,791 A * | 8/1931 | Forrest | ............................ | 33/348 |
| 2,532,402 A * | 12/1950 | Herbold | ......................... | 318/581 |
| 2,645,030 A * | 7/1953 | Mahone | ........................... | 33/390 |
| 2,762,123 A * | 9/1956 | Schultz et al. | ................ | 33/1 SA |
| 3,084,443 A * | 4/1963 | Kaatz et al. | .................... | 356/140 |
| 3,486,239 A * | 12/1969 | Boeder De Forrest | .......... | 33/352 |
| 3,488,504 A * | 1/1970 | Lowen et al. | ................. | 250/206 |
| 4,488,041 A * | 12/1984 | Baudot | ..................... | 250/231.12 |
| 8,046,928 B2 * | 11/2011 | Choi | ............................ | 33/366.12 |
| 8,539,688 B2 * | 9/2013 | Wing | .............................. | 33/390 |
| 2004/0093750 A1 * | 5/2004 | Quinby, III | ..................... | 33/364 |

* cited by examiner

*Primary Examiner* — Christoher Fulton
(74) *Attorney, Agent, or Firm* — Mark R. Malek; Zies Widerman & Malek

(57) ABSTRACT

A method and device are described for defining a pair of position angles needed to measure an angular location of a point in space with respect to a central point using a sphere having surface measurements substantially similar to a Cartesian coordinate system, and a cardinal point with a pair of angular coordinates thereof that represent the pair of position angles. The method may also be performed using a substantially Cartesian two dimensional surface wherein the diameter of the sphere divided by the fractional length of the coordinate along the X and Y axes provides the X and Y angular values of the pair of position angles, respectively. Such features enable use of this method for simplification of computational tasks, as well as more readily understandable graphics and devices regarding the position, trajectory, and orientation of an object in space.

37 Claims, 22 Drawing Sheets

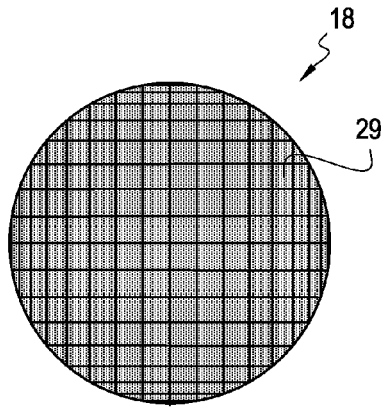 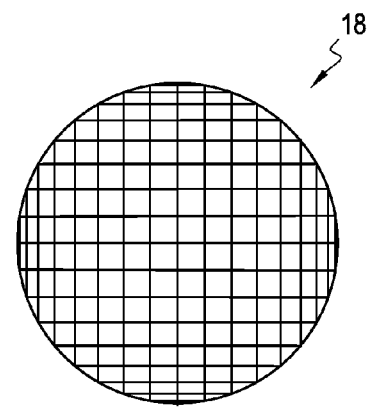
Fig. 7a　　　　　　　　　　Fig. 7b
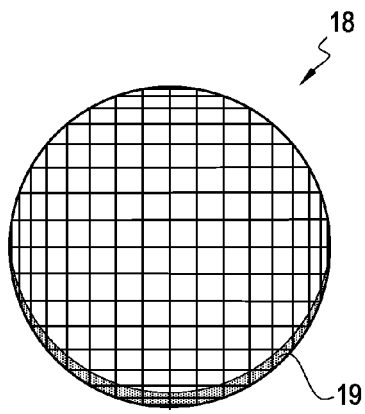 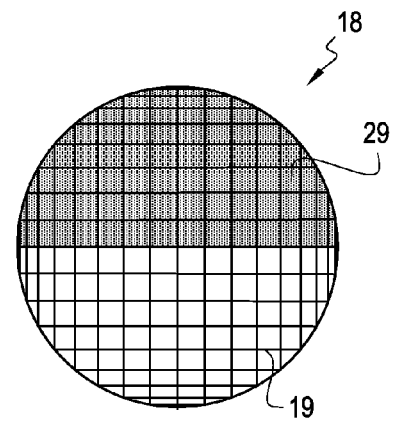
Fig. 7c　　　　　　　　　　Fig. 7d
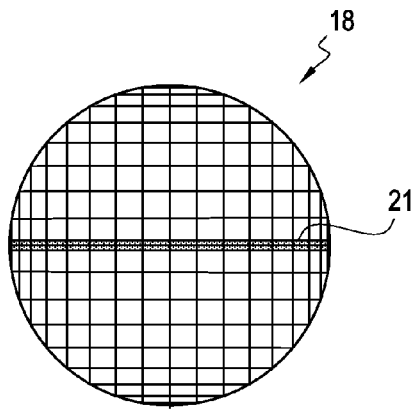
Fig. 7e

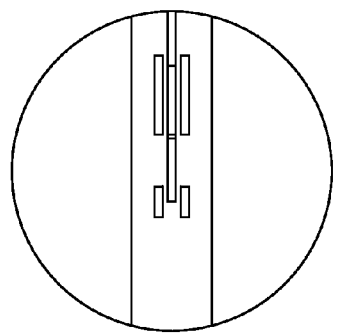 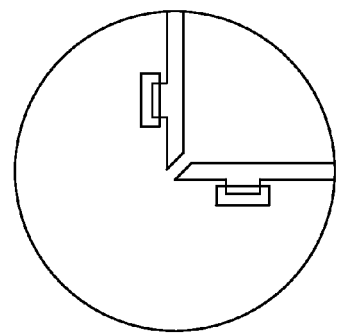
Fig. 20a    Fig. 20b
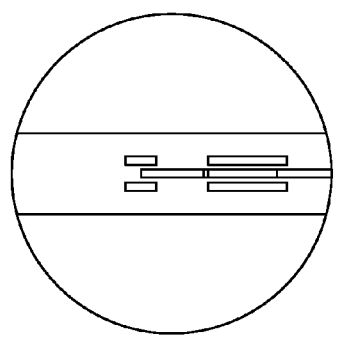
Fig. 20c

DEVICE FOR DEFINING AN ANGLE, ASSOCIATED METHODS, AND METHODS FOR DEFINING ANGULAR PROPERTIES OF OBJECTS

FIELD OF THE INVENTION

The present invention relates to the field of mathematics and, more specifically, to a device for defining an angle to be measured using an angular coordinate system for measuring multidimensional angles, associated methods for measuring angles, and methods for defining a position and trajectory of an object.

BACKGROUND OF THE INVENTION

As multi-dimensional beings, humans have long felt a need to map out and measure their surroundings. Because of this, various coordinate systems, including Cartesian, polar, cylindrical, and spherical coordinate systems, have been developed, and are widely used in everyday life to help designate where in space an object is in relation to a reference point, or in relation to another object.

The polar coordinate system, for instance, is a two-dimensional coordinate system wherein each point on a plane is determined by a distance from a reference point and an angle from a reference line having a fixed direction, the reference point being the vertex of the angle formed by the reference line and the angle. The reference point (analogous to the origin of a Cartesian system) is defined as the pole, and the line having the fixed direction is defined as the polar axis. The distance from the pole to the point in space may be referred to as the radial coordinate or radius, and the angle may be referred to as the angular coordinate, polar angle, or azimuth.

A cylindrical coordinate system is a three-dimensional coordinate system that provides for a determination of a position of a point using the distance from a chosen reference axis, the direction from the axis relative to a chosen direction, and the distance from a reference plane perpendicular to the axis. The distance from the chosen reference axis may be provided as a positive or negative number depending on which side of the reference plane faces the point for which the position is to be determined. The intersection between the reference plane and the axis is defined as the origin of the system. More specifically, the origin of the system may be defined as the point where all three coordinates may be given a zero value. The axis may be referred to as the cylindrical or longitudinal axis, to differentiate it from the polar axis. The distance from the axis to the point in space may be referred to as the radial distance or radius, while the angular coordinate may sometimes be referred to as the angular position or as the azimuth. The radius and the azimuth are therefore defined as the polar coordinates, as they correspond to a two-dimensional polar coordinate system in the plane through the point, parallel to the reference plane. The third coordinate may be defined as the height or altitude (if the reference plane is considered horizontal), longitudinal position, or axial position. Cylindrical coordinates are useful in connection with measurements relating to objects and phenomena that have some rotational symmetry about the longitudinal axis, such as water flow in a straight pipe with a round cross-section, heat distribution in a metal cylinder, and so on.

A spherical coordinate system may be described as a coordinate system for three-dimensional space where the position of a point is specified by three numbers: the radial distance of that point from a fixed origin, its inclination angle measured from a fixed zenith direction, and the azimuth angle of its orthogonal projection on a reference plane that passes through the origin and is orthogonal to the zenith, measured from a fixed reference direction on that plane. The inclination angle is often replaced by the elevation angle measured from the reference plane. The radial distance may also be referred to as the radius or radial coordinate, and the inclination angle may also be referred to as co-latitude, zenith angle, normal angle, or polar angle.

In geography and astronomy, the elevation and azimuth (or quantities very close to them) may be referred to as the latitude and longitude, respectively. Radial distance may be replaced by an altitude (measured from a central point or from a sea level surface). Spherical coordinates can also be used in relation to measurements extending to higher dimensional spaces and, in such a case, may be referred to as hyperspherical coordinates. One of the disadvantages of the above referenced coordinate systems, however, is the inability to measure both of the angles that define a tridimensional position, i.e., two angles orthogonal to each other within the same plane. Such a situation proves difficult for a user to measure both angles in a unique observer's position.

Accordingly, a need exists for an angular measurement system and method for using an angular measurement device that may advantageously be used to read angles within orthogonal vertical planes that can be used to infer three-dimensional angles.

SUMMARY OF THE INVENTION

The present invention provides a different approach for measuring three dimensional angular positions and trajectories in space with respect to the origin of a system. Technologies and instruments that need simpler, faster three dimensional angle measurement, such as, for example, surgical navigation, space navigation, defense, industrial design, architecture, civil and mechanical engineering, and product manufacturing, stand to benefit from the angular coordinate system, device and methods according to embodiments of the present invention. Embodiments of the present invention also advantageously enable time saving three dimensional angular measurements from a single two dimensional picture. Embodiments of the present invention also provides advanced, elegant embodiments for vector measurement which may include upgrading vector sensor design and performance of inclinometers and accelerometers, for example. The present invention, when applied to sensors, may also be used in connection with microelectromechanical systems (MEMS) which are sometimes associated with avionics, navigational systems, and dynamic systems.

The present invention may advantageously be useful, for example, for a surgeon that is unable to change his or her point of view when inserting a screw through a patient's spine because he or she can only see through the surgical work channel. This advantageously may save the surgeon, and the patient, a great deal of time, and eliminate many additional medical procedures such as, for example, the need to take additional x-rays to ensure that the screw remains on the right trajectory while the screw is being positioned and screwed during surgery. The angular measurement system and method of the present invention can read both horizontal and vertical angles at the same time, which are necessary in order to ensure that the screw remains on the proper trajectory.

With the foregoing in mind, embodiments of the present invention are related to a device and method that may advantageously be used to readily determine two and three dimensional angles relative to an object being observed without requiring a perspective change of the observer. These and other objects, features, and advantages according to embodiments of the present invention are provided by a device for defining an angle to be measured. The device may have an outer sphere which may include a plurality of outer surface circumferential markings that may be positioned on a surface portion thereof, and may be centered about an outer sphere axis. The device may further include an inner sphere which may be carried by the outer sphere. The inner sphere may have a first and second plurality of inner surface circumferential markings positioned on a surface portion thereof. The first plurality of inner surface circumferential markings may be centered about a first inner sphere axis, and the second plurality of inner surface circumferential markings may be centered about a second inner sphere axis. The first inner sphere axis and the second inner sphere axis may also be oriented substantially perpendicular to one other.

The device may also include an outer sphere fluid carried by the outer sphere, and may also include a measurement fluid suspended in the outer sphere fluid exterior to the inner sphere, which may also be suspended in the outer sphere fluid. The plurality of outer surface circumferential markings and the first and second plurality of inner surface circumferential markings may further represent angular values. Consequently, the angle to be measured may be defined as a position of an intersection of one of the plurality of outer surface circumferential markings with at least one of the first and second plurality of inner surface circumferential markings. The plurality of outer surface circumferential markings may be oriented substantially parallel to one another. The first plurality of inner surface circumferential markings and the second plurality of inner surface circumferential markings, however, may be oriented substantially orthogonal to each other.

The device may further include a cardinal point positioned on the outer surface portion of the outer sphere, which may represent a zero value. The device may also include an inner sphere fluid, which may be carried by the inner sphere. The inner sphere fluid and the outer sphere fluid may have substantially similar densities. The outer sphere may be made of a substantially transparent material. The outer surface portion of the outer sphere may also include a mounting receiving member to receive a mounting device. The mounting receiving member may further be positioned at the cardinal point. The inner sphere may also include a polar axis oriented substantially perpendicular to the first inner sphere axis and the second inner sphere axis.

The angle to be measured may further be defined as a position of an intersection of the pole with at least one of the first and second plurality of inner surface markings. The inner sphere may also be heavier on a portion thereof, and may also contain a set of at least three gyroscopes which may maintain an orientation when the outer sphere may be moved.

A method aspect of the present invention is for measuring an angle using the device. The method may include aligning a marking on the device that represents a zero value along a segment of the angle to be measured. The plurality of outer surface circumferential markings and the first and second plurality of inner surface circumferential markings may represent angular values. The angle to be measured may be defined as a position of an intersection of one of the plurality of outer surface circumferential markings with at least one of the first and second plurality of inner surface circumferential markings.

Another method aspect of the present invention is for defining a position and trajectory of an object in space with respect to a point in space. The method may include defining a first straight axis and a second straight axis through the point in space. The first straight axis and the second straight axis may be oriented substantially perpendicular to each other. The method may also include defining a first circle shaped axis through the object in space, wherein the first circle shaped axis may intersect its geometric center with the first straight axis. The method may further include defining a second circle shaped axis through the object in space that may intersect its geometric center with the second straight axis. The first circle shaped axis and the second circle shaped axis may be oriented substantially perpendicular to one another.

The method may also include defining a sphere distance from the object in space to the point in space, and may also include defining a sphere having a radius that may be substantially similar to the sphere distance. The method may further include defining a first set of measurement markers along the sphere and a second set of measurement markers along the sphere. The first set of measurement markers and the second set of measurement markers may be oriented substantially perpendicular to each other.

The method may still further include defining a line extending from the point in space to the object in space. The angular position of the object in space with respect to the point in space may be determined by locating the intersection of at least one of the first set of measurement markers and at least one of the second set of measurement markers. The position of the object in space with respect to the point in space may be determined by locating the intersection of at least one of the first set of measurement markers, at least one of the second set of measurement markers, and the line defined from the point in space to the object in space.

The angular trajectory of the object in space with respect to the point in space may be determined by locating a first intersection of at least one of the first set of measurement markers with at least one of the second set of measurement markers with respect to a second intersection of at least one of the first set of measurement markers with at least one of the second set of measurement markers. The trajectory of the object in space with respect to the point in space may be determined by calculating a distance traveled between the first intersection and the second intersection over a period of time.

The method, including the steps of defining the first straight axis and the second straight axis, defining the first circle shaped axis and the second circle shaped axis, defining the sphere distance, defining the sphere, determining the angular position, the position, the angular trajectory, and the trajectory of the object in space with respect to the point is space, may carried out using a computer.

The first and second set of measurement markers may represent angular values, and the point in space may be defined as a cardinal point. The cardinal point may further be defined as a zero value. The first set of measurement markers may be centered about the first straight axis, and the second set of measurement markers may be centered about the second straight axis. The first and second sets of measurement markers may also be centered about the cardinal point.

Alternately, the point in space may represent a second object in space, which may be oriented with respect to the cardinal point. The orientation of the second object in space with respect to the cardinal point may be determined by locating the intersection of at least one of the first set of measurement markers and at least one of the second set of measurement markers with an observed axis. An observed axis may be defined as a perceived length of the line extending from the point in space to the object in space. The orientation of the second object in space and the length of the observed axis may be calculated using a computer.

BRIEF DESCRIPTION OF THE DRAWINGS

FIGS. 7A-E are elevation views of alternate embodiments of an inner sphere of the device illustrated in FIG. 1.

FIGS. 20A-C are various views of an embodiment of a device for defining an angle to be measured according to an embodiment of the present invention as used in connection a MEMS device.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Referring now to FIGS. 1-22, an angle measurement device 10 and methods for defining angular measurements according to embodiments of the present invention are now described in greater detail. Throughout this disclosure, the angle measurement device 10 may also be referred to as a device or the invention. Alternate references of the angle measurement device 10 in this disclosure are not meant to be limiting in any way.

Figure 1:
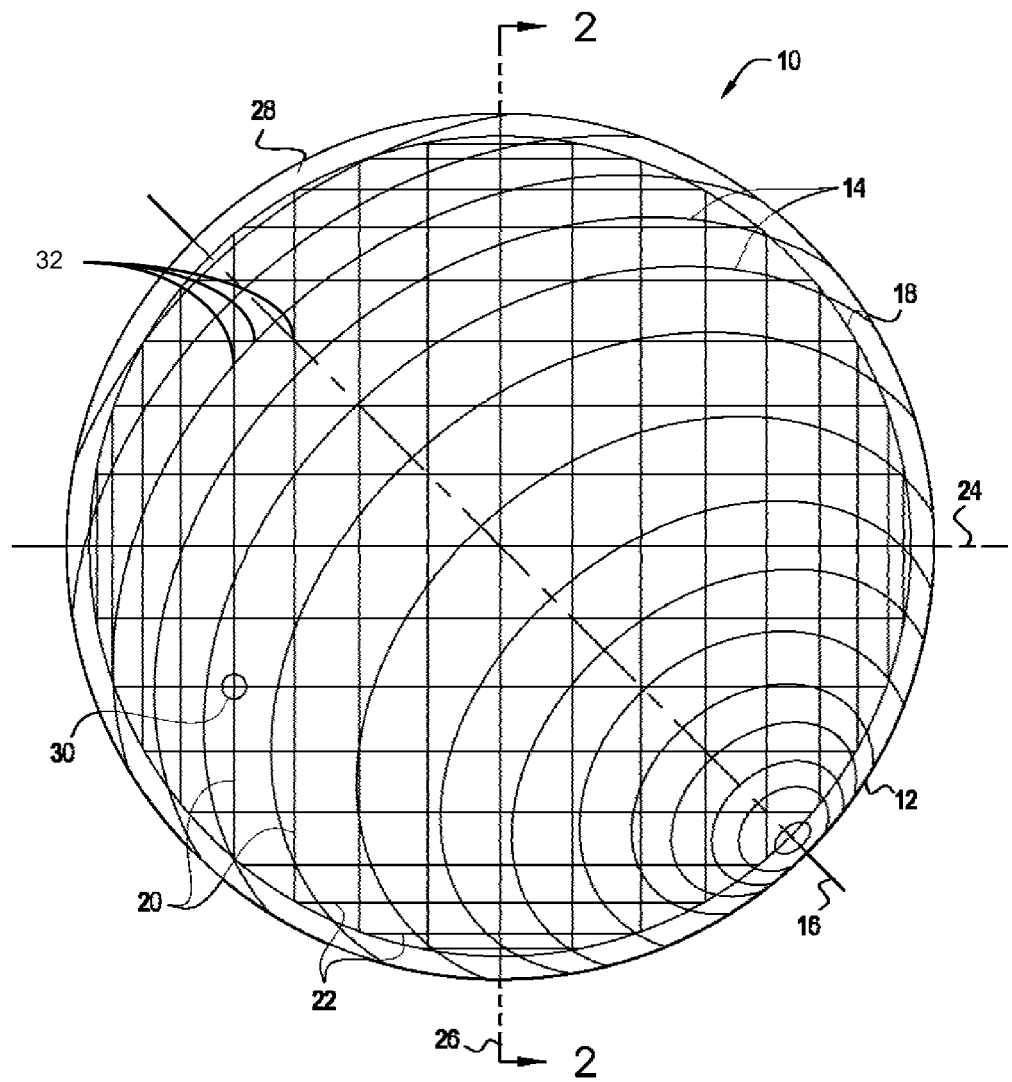
FIG. 1 is a perspective view of a device for defining an angle to be measured according to an embodiment of the present invention.
Figure 2:
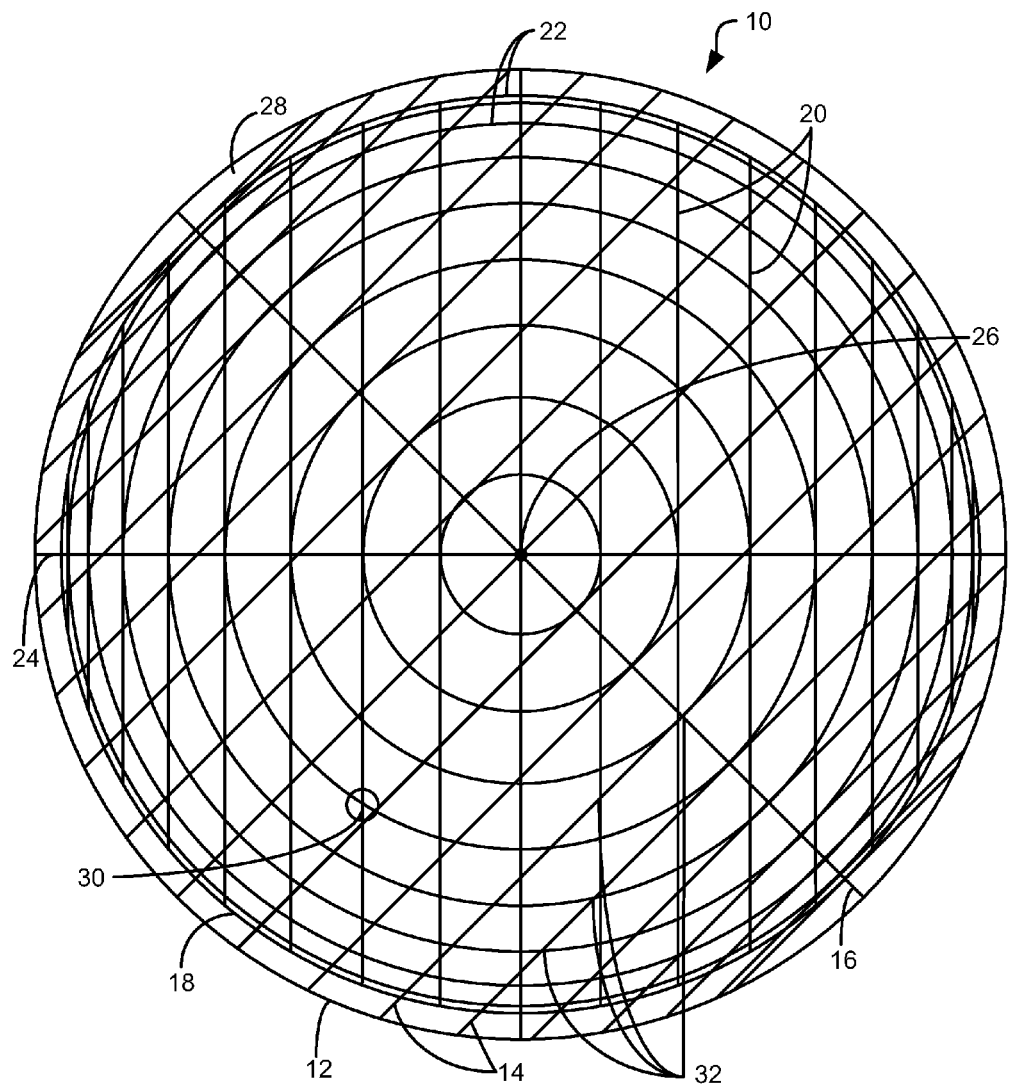
FIG. 2 is a cross-sectional view of the device illustrated in FIG. 1 taken through line 2-2.
Figure 3:
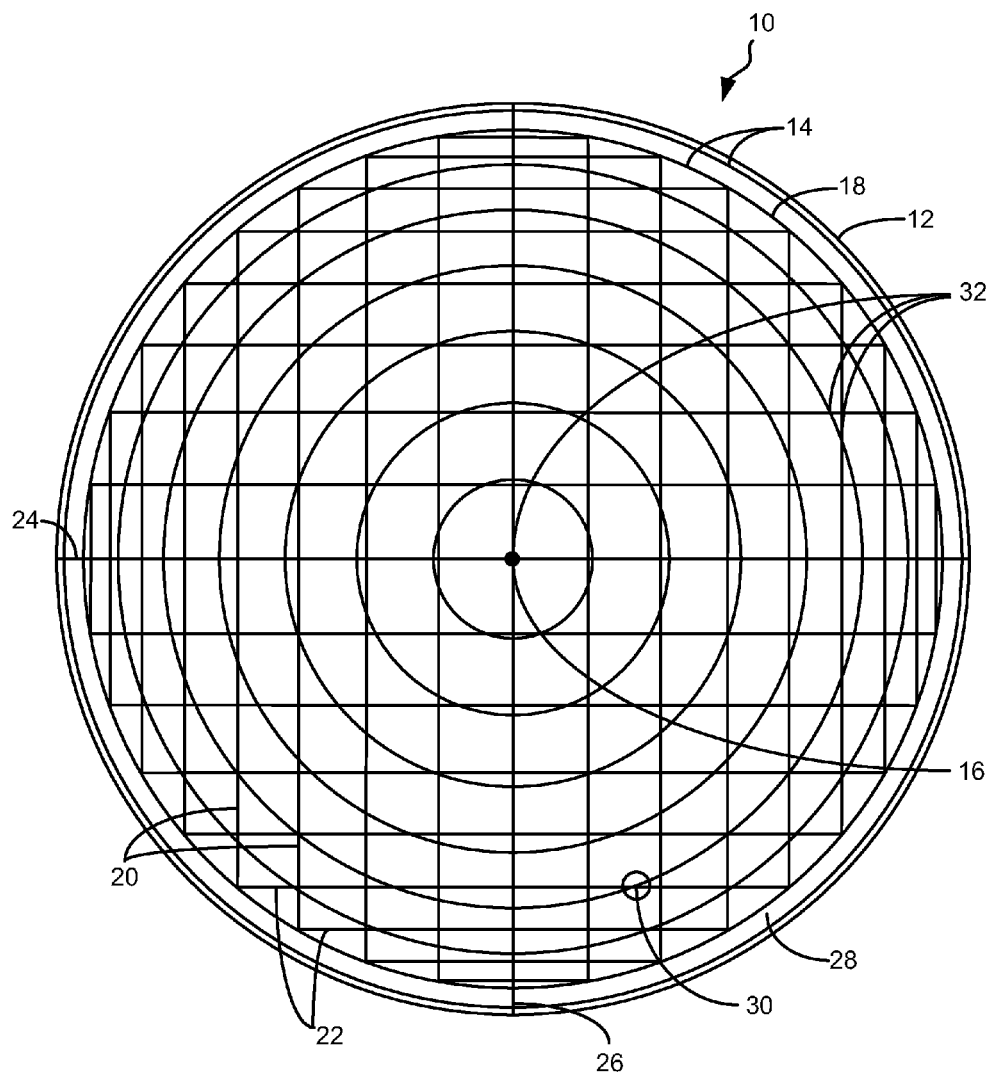
FIG. 3 is an elevation view of the device illustrated in FIG. 1.
Figure 4A:
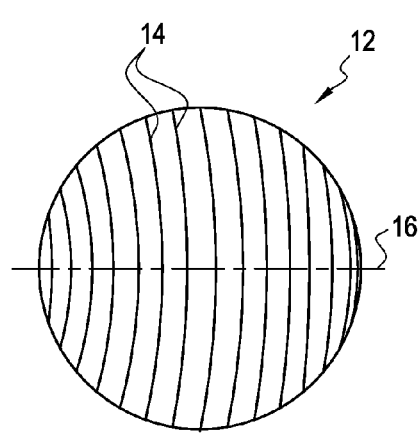
FIGS. 4A-C are elevation views of an outer sphere of the device illustrated in FIG. 1.
Figure 4B:
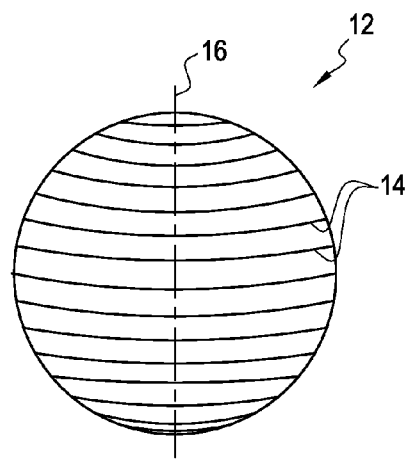
Figure 4C:
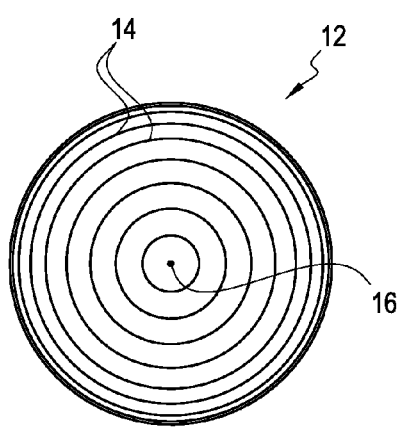
Figure 4D:
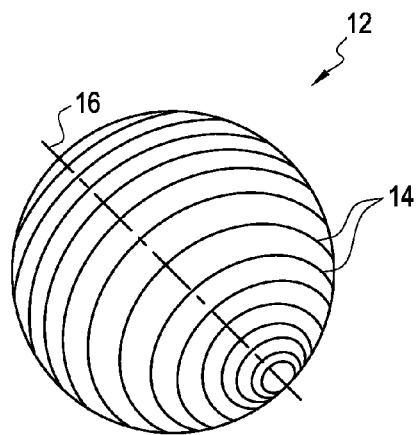
FIG. 4D is a perspective view of an outer sphere of the device illustrated in FIG. 1.
Figure 5A:
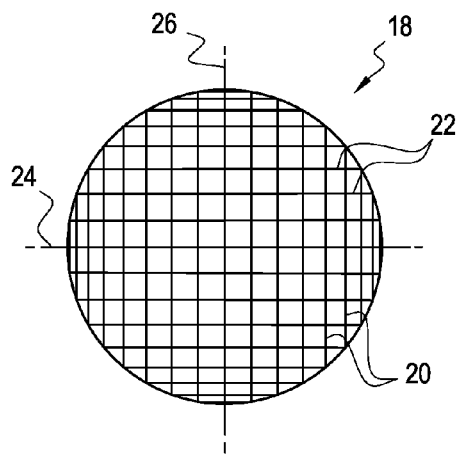
FIGS. 5A-C are elevation views of an inner sphere of the device illustrated in FIG. 1.
Figure 5B:
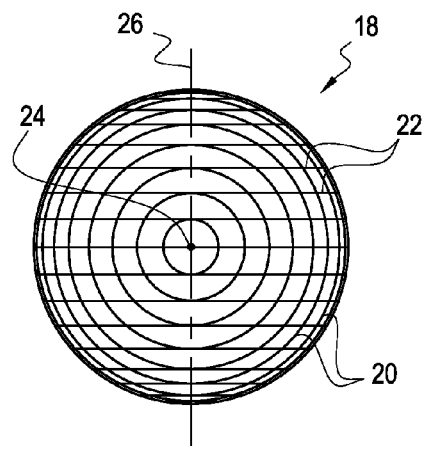
Figure 5C:
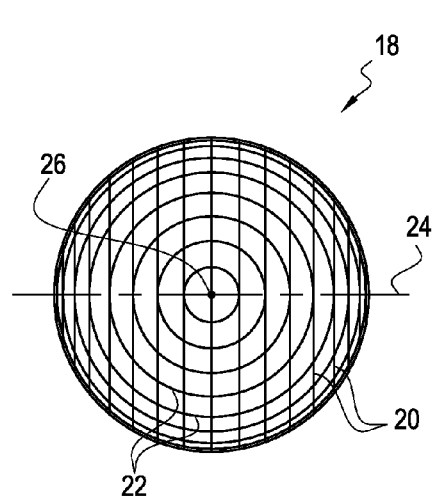
Figure 5D:
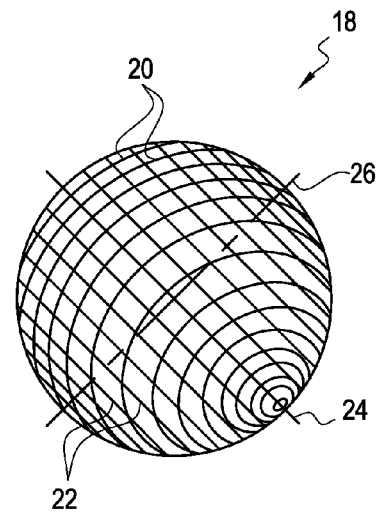
FIG. 5D is a perspective view of an inner sphere of the device illustrated in FIG. 1.

Referring now to FIGS. 1-3, a device 10 for defining an angle to be measured according to an embodiment of the present invention is described in greater detail. The device 10 may include an outer sphere 12 having a plurality of outer surface circumferential markings 14 positioned on a surface portion of the outer sphere 12. The plurality of outer sphere circumferential markings 14 may be centered about an outer sphere axis 16. The outer sphere 12 is also illustrated in FIGS. 4A-D, showing how the plurality of outer surface circumferential markings 14 may be positioned about the outer sphere axis 16. For example, as illustrated in FIG. 4A, the outer surface circumferential markings 14 may be vertically oriented and centered about a horizontal axis. FIG. 4B illustrates the outer surface circumferential markings 14 oriented horizontally centered about a vertical axis. FIG. 4C is a top plan view of the outer sphere 12 illustrated in FIG. 4B, i.e., a view showing the vertically oriented axis 16 and the horizontally oriented outer surface circumferential markings 14 positioned therearound. FIG. 4D illustrates a perspective view of the outer sphere depicted either FIG. 4A or 4B showing the outer surface circumferential markings 14 positioned around an axis 16. The skilled artisan will recognize that the outer sphere axis 16 may alternately be defined as a pole. Future references to the pole 16 are not intended to be limiting in any way. Those skilled in the art will further appreciate that FIGS. 4A-D are not meant to limit the outer sphere 12 from having more than one set of outer sphere circumferential markings 14, i.e., the device 10 according to embodiments of the present invention is intended to include horizontally oriented outer sphere circumferential markings, vertically oriented outer sphere circumferential markings, or both.

Referring back to FIGS. 1-3, the device 10 according to an embodiment of the present invention may also include an inner sphere 18, which may be carried by the outer sphere 12. The inner sphere 18 may have a first and second plurality of inner surface circumferential markings 20, 22 positioned on a surface portion thereof. The first plurality of inner surface circumferential markings 20 may be centered about a first inner sphere axis 24, and the second plurality of inner surface circumferential markings 22 may be centered about a second inner sphere axis 26. The first inner sphere axis 24 and the second inner sphere axis 26 may oriented substantially perpendicular to one other.

While the inner sphere 18 is depicted as having first and second pluralities of inner surface circumferential markings 20, 22, and the outer sphere 12 is depicted as having only one plurality of outer surface circumferential markings 14, the skilled artisan will readily recognize that the sets of markings may be reversed while remaining within the scope and spirit of the present invention. That is, the inner sphere 18 may have one set of circumferential markings, while the outer sphere 12 may have first and second sets of circumferential markings while still accomplishing the various goals, features, objectives, and ideals of the embodiments of the present invention.

Referring again to FIGS. 1-3, embodiments of the device 10 may also include an outer sphere fluid 28, which may be carried by the outer sphere 12. A measurement fluid 30 may also be suspended in the outer sphere fluid 28, exterior to the inner sphere 18, which may also be suspended in the outer sphere fluid 28. The skilled artisan will note that any fluid, whether liquid or gas, may be used for the measurement fluid 30, but that it may be preferable to use a fluid of a different density than outer sphere fluid 28. For example, the outer sphere fluid 28 may be water, while the measurement fluid 30 may be provided by air, i.e., an air bubble suspended in the water of the outer sphere fluid. The skilled artisan will note that it may be advantageous to use a cohesive fluid as the measurement fluid 30, but will further appreciate that any fluid may be used as either the measurement fluid or the outer sphere fluid.

The plurality of outer surface circumferential markings 14 and the first and second plurality of inner surface circumferential markings 20,22 may represent angular values. The angle to be measured may, therefore, be defined as a position of an intersection 32 of one of the plurality of outer surface circumferential markings 14, for example, but not meant to be limiting in any way, the pole 16, with at least one of the first and second plurality of inner surface circumferential markings 20,22.

Referring now also to FIGS. 5A-D, multiple views of the inner sphere 18 are presented, showing how the first plurality of inner surface circumferential markings 20 and the second plurality of inner surface circumferential markings may be positioned about the first inner sphere axis 24 and the second inner sphere axis 26, respectively. As will be readily recognized by the skilled artisan, after having had the benefit of reading this disclosure, and depicted in the aforementioned figures, the plurality of outer surface circumferential markings 14 may be oriented substantially parallel to one another. The skilled artisan will also readily recognize, after having had the benefit of reading this disclosure, that the first plurality of inner surface circumferential markings 20 and the second plurality of inner surface circumferential markings 22 may be oriented substantially orthogonal to each other.

Figure 6:
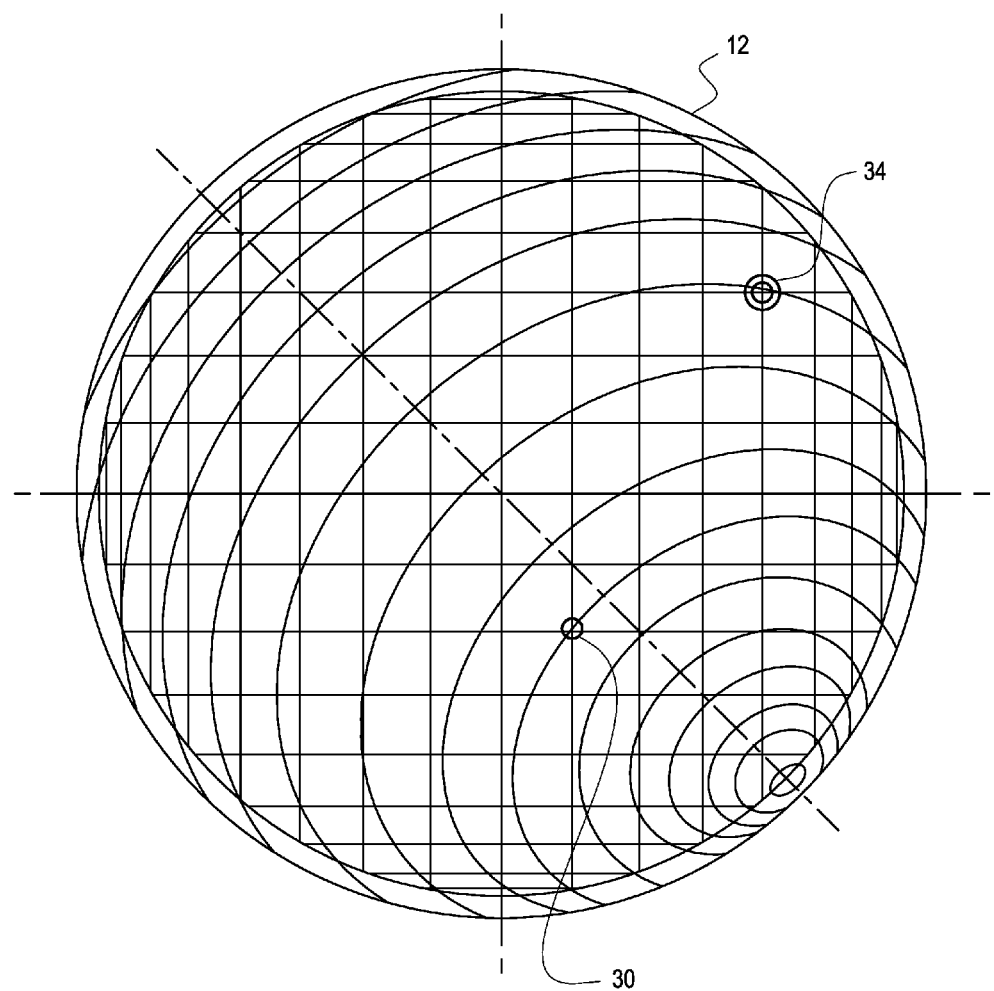
FIG. 6 is a perspective view of the device illustrated in FIG. 1 showing a cardinal point positioned on an outer sphere.

Referring now to FIG. 6, the device for defining an angle to be measured, according to an embodiment of the present invention, is shown further comprising a cardinal point 34 positioned on the outer surface portion of the outer sphere 12. The cardinal point 34 may represent a zero value. The cardinal point 34 may be manipulable to have any value or be located anywhere on the device 10, and is not intended to be limited by the figure shown. Further, the cardinal point 34 may be advantageously placed to mark one of the straight axes or, alternatively, to mark a starting position of an object in motion. Accordingly, the cardinal point 34 is a visible marker on a surface portion of the outer sphere 12 that aids a user in defining the angle to be measured, and that provides the user with a starting or ending point when defining a trajectory to be measured using the device 10 according to an embodiment of the present invention.

Referring now to FIGS. 7A-E, alternate embodiments of the inner sphere 18 will now be discussed in detail. Referring first to FIG. 7A, an inner sphere 18 having inner sphere fluid 29 carried therein is shown. The inner sphere fluid 29 and the outer sphere fluid 28 may have substantially similar densities, but, as will be readily recognized by one skilled in the art, need not necessarily have similar densities. As will also be recognized by one skilled in the art, and as illustrated in FIG. 7B, the inner sphere 18 may be solid. Further, the inner sphere 18 may be substantially transparent. This advantageously allows a user to readily visualize an object being measured that may be positioned on a side of the device 10 that is opposite from the viewing side of the user. In other words, in an embodiment of the device 10 wherein the inner sphere 18 is substantially transparent, the user can look through the device to visualize anything that may be positioned on an opposite side of the device. The solid inner sphere 18 may also have a substantially similar density as the outer sphere fluid 28, which will be readily recognized as advantageous to one skilled in the art because it allows the inner sphere to be substantially, freely suspended. Those skilled in the art will appreciate that it may be preferable for the outer sphere fluid 28 and the inner sphere fluid 20 to have slightly varying densities to better enable the inner sphere 18 to be freely suspended within the outer sphere 12, but that the device 10 according to an embodiment of the present invention contemplates that the inner sphere fluid and the outer sphere fluid can have any densities. In such a case, the inner sphere 18 would be recognized as having a substantially neutral buoyancy.

Referring now to FIG. 7C, another embodiment of the inner sphere 18 of the device 10 according to an embodiment of the present invention, will now be discussed. The invention contemplates that the inner sphere 18 of the device 10 may be comprised of various materials having differing densities. That is, a portion 19 of the inner sphere 18 of the device 10 may be made denser, i.e. heavier or weighted, such that the inner sphere 18 maintains a certain orientation with respect to a gravitational pull. This can be advantageous when using the device 10 in association with navigation, for example. This can be particularly advantageous when using the device in connection with navigation onboard a vessel or aircraft that experiences varying horizontal and vertical orientations during routine operation. Referring additionally to FIG. 7D, the varying density of the inner sphere is illustrated as having a partially solid inner sphere 18, wherein the rest of the inner sphere 18 is filled with an inner sphere fluid 29 of a different density.

Referring now to FIG. 7E, yet another embodiment of the inner sphere 18 of the device 10 according to the present invention is now described. The inner sphere 18 may additionally include a band of ferromagnetic material 21 in order to maintain the inner sphere 18 in a position with respect to magnetic north. Those skilled in the art will appreciate that the ferromagnetic material may be included in a lower pole of the inner sphere 18 of the device 10 to maintain a position with respect to magnetic north and a gravitational pull. Further, this may be implemented as weighting a portion 19 of the inner sphere 18, as illustrated in FIG. 7C, or as a partially solid inner sphere 18, wherein the solid portion is a ferromagnetic material and the remainder of the inner sphere 18 is filled with an inner sphere fluid 29, as illustrated in FIG. 7D. The skilled artisan, after having had the benefit of this disclosure, may readily recognize additional combinations and modifications of the inner sphere 18 while keeping with the spirit of the various goals and objectives of the present invention. The ferromagnetic material 21 illustrated in FIG. 7E is positioned about an equatorial line of the inner sphere 18, but the present invention contemplates that the ferromagnetic material may be positioned anywhere on the inner sphere while still accomplishing the goal of using such material, i.e., maintaining the inner sphere in an orientation with respect to magnetic north, or providing a ballast to the inner sphere to maintain a particular orientation thereof. Such additional combinations and modifications are intended to be included within the scope and spirit of the present invention, which is not intended to be limited to the embodiments disclosed above.

The skilled artisan wall readily recognize that the outer sphere 12 may be comprised of a substantially transparent material. While the outer sphere 12 may also be comprised of a substantially translucent material, a substantially transparent material is preferred. As indicated above, use of a transparent material advantageously allows for an object positioned on an opposite side of the device 10 to be readily visible therethrough. Further, the skilled artisan will readily recognize that the outer sphere 12 may also be made of a colored, substantially transparent, material. This may be advantageous in situations requiring use of more than one device 10, particularly in cases where multiple embodiments of the device 10 may be employed. Such a situation may, for example, be one in where an embodiment of the device 10 using the ferromagnetic material 21 on the inner sphere 18 (illustrated in FIG. 7E) is used to define an angle, and another embodiment of the device 10 using an inner sphere carried by a mounting receiving member 38 (illustrated in FIG. 8 and will be discussed in greater detail below) being used to define another angle. In other words, in a case where two versions of the device 10 may be used to define different angular values, the outer spheres 12 of the devices may, for the sake of convenience and clarity, have different colors.

Figure 8:
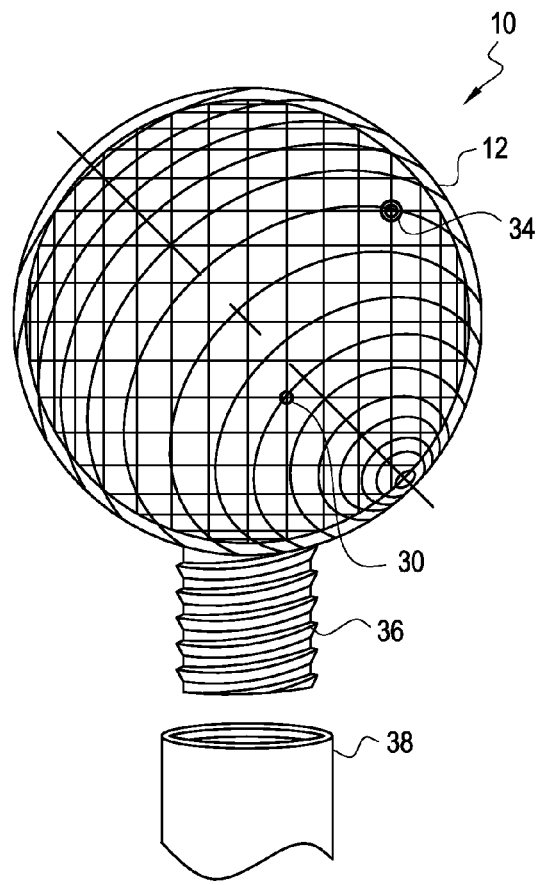
FIG. 8 is a perspective view of the device illustrated in FIG. 1 and showing a mounting receiving member connected thereto to be connected to a mounting device.

Referring now to FIG. 8, additional embodiments of the device 10 according to the present invention will be discussed. As shown in FIG. 8, the outer surface of the outer sphere 12 may include a mounting receiving member 36, which may receive a mounting device 38. In this embodiment, the device 10 may include a cardinal point 34 positioned on the outer surface portion of the outer sphere 12. The cardinal point 34 may represent a zero value, or may be manipulable with respect to the object to be measured, i.e., with respect to determining the angular values of the object to be measured. Although the mounting receiving member 36 is illustrated in a position extending from a bottom portion of the device 10 in FIG. 8, it is contemplated that the mounting receiving member 36 may be positioned at the cardinal point 34. This advantageously allows for the mounting receiving member to act as the reference point from which the object is to be measured. The skilled artisan will readily recognize, however, after having had the benefit of this disclosure, that the mounting receiving member 36 may be placed on any part of the outer surface portion of the outer sphere 12. Uses for a device 10 having a mounting receiving member 36 will be discussed in greater detail below.

Figure 9:
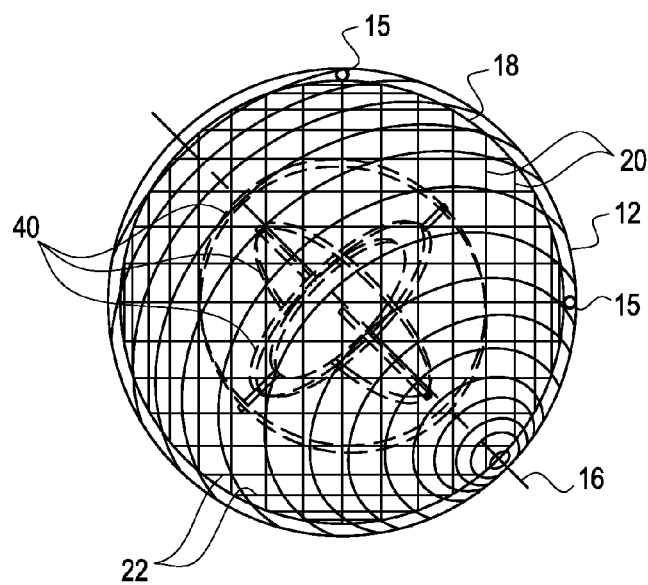
FIG. 9 is a perspective view of an embodiment of the device illustrated in FIG. 1 showing use of gyroscopes and gimbals.

Referring now to FIG. 9, yet another alternate embodiment of the device 10 is shown. As indicated in FIG. 9, the angle to be measured may further be defined as a position of an intersection of the pole 16 with at least one of the first and second plurality of inner surface markings 20,22. As also depicted in FIG. 9, the inner sphere 18 of the device 10 may alternately contain a set of at least three gyroscopes 40. Such gyroscopes 40 may be advantageously used in order to maintain a desired orientation of the inner sphere 18 when the outer sphere 12 is moved. For example, one may desire to maintain the inner sphere 18 in a northward directed orientation. In order to maintain such an orientation of the inner sphere 18, the inner sphere is initially positioned in the northward directed orientation so that as the outer sphere 12 is rotated, the gyroscopes 40 allow the inner sphere to maintain an inertial state and absorb the rotation of the outer sphere.

The skilled artisan will readily note that any number of gyroscopes 40 may be used to maintain the desired orientation of the inner sphere 18, and that such alternate embodiments are intended to be included within the scope and spirit of the present invention. The skilled artisan, after having had the benefit of this disclosure, will also readily note the advantages of using at least three gyroscopes 40, particularly to maintain an accurate state of balance, and to devote at least one gyroscope to each individual dimensional axis within the inner sphere 18. In other words, the three gyroscopes are respectively devoted to the X, Y and Z axes, as understood by those skilled in the art.

Additionally, the outer sphere fluid 28 may be replaced by a set of at least two gimbals 15 that maintain the orientation of the gyroscopes 40 regardless of any movement by the outer sphere 12. Of course, the set of at least two gimbals 15 can also maintain the orientation of a inner sphere 18 that has ferromagnetic material, or higher density on its lower half. Thus, the inner sphere 18 may be immune to angular acceleration due to the gyroscopes 40 mounted therein. The result is that the inner sphere 18 can be set to maintain a given direction (north in the example provided above) and the outer sphere 12 may be used to navigate a vessel (also for example). The embodiment of the device according to the present invention described above advantageously provides an easily readable set of three-dimensional angular coordinates, as well as a trajectory to follow on a singular unit.

Figure 10:
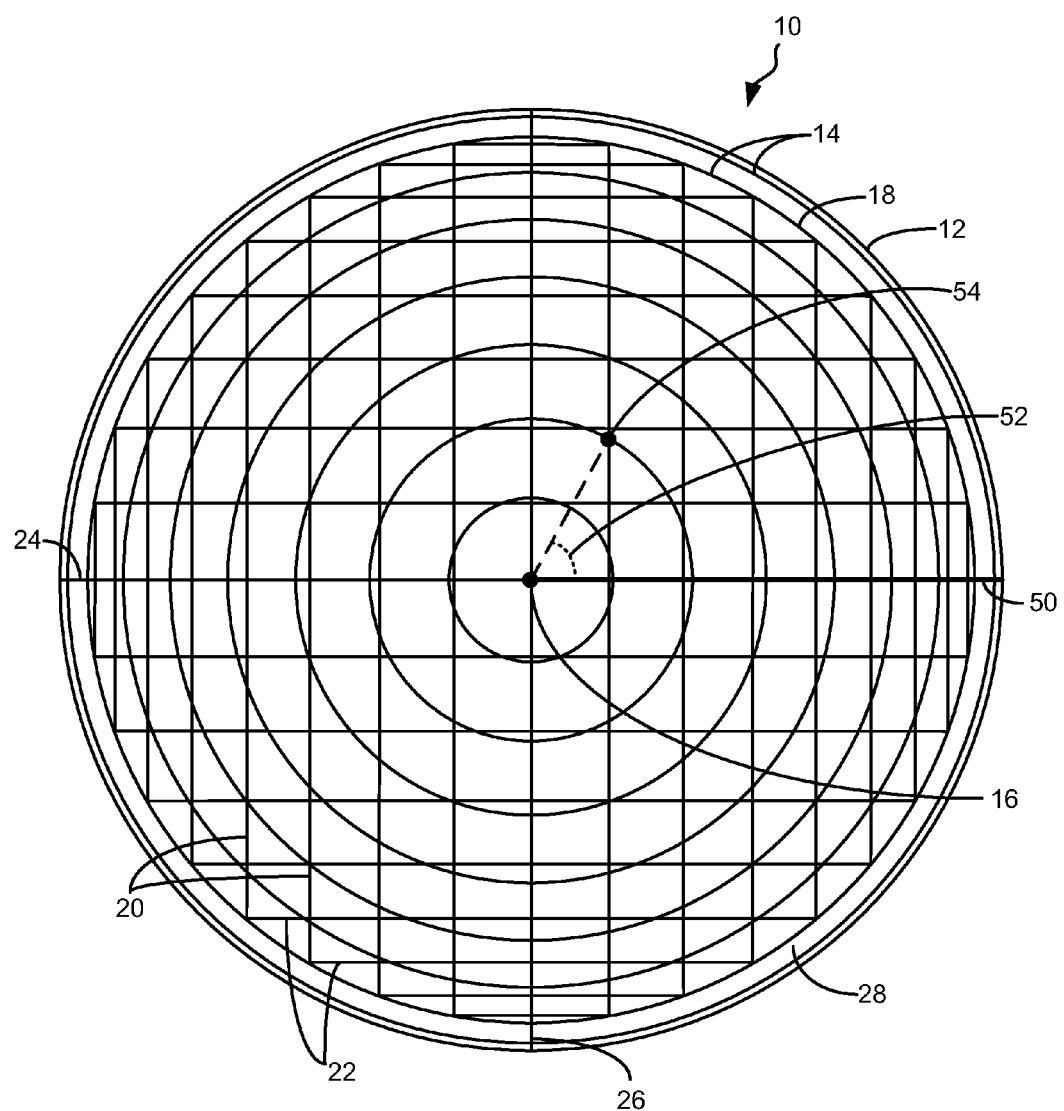
FIG. 10 illustrates measurement of an angle using an embodiment of the device illustrated in FIG. 1.

Referring now to FIG. 10, steps taken to define the angular values using the device 10 according to an embodiment of the present invention will be discussed in greater detail. As indicated above, the device 10 may include an outer sphere 12 with a plurality of outer surface circumferential markings 14 positioned on a surface portion and centered about an outer sphere axis 16. The device 10 may also include an inner sphere 18, which may be carried by the outer sphere 12. The inner sphere 18 may additionally have a first and second plurality of inner surface circumferential markings 20,22 positioned on a surface portion 19 thereof. The device may additionally include an outer sphere fluid 28, which may be carried by the outer sphere 12, and a measurement fluid 30 which may be suspended in the outer sphere fluid 28 exterior to the inner sphere 18, as described in greater detail above.

Continuing to refer to FIG. 10, the method, according to an embodiment of the present invention, may include aligning a marking 50 on the device 10 that represents a zero value along a segment of the angle to be measured 52. The pole 16 may, for example, may represent a zero value. The plurality of outer surface circumferential markings 14 and the first and second plurality of inner surface circumferential markings 20, 22 may represent angular values. The skilled artisan will recognize that the outer surface circumferential markings 14 and the first and second plurality of inner surface circumferential markings 20, 22 may represent any angular value, and that having the markers represent angular values that are multiples of ten degrees may be particularly advantageous and easy to use. Those skilled in the art, however, will readily appreciate that markers representing any angular values may be readily used along both the inner sphere 18 and the outer sphere 12. The angle 10 be measured 52 may be defined as a position of an intersection 54 of one of the plurality of outer surface circumferential markings 14 with at least one of the first and second plurality of inner surface circumferential markings 20, 22. For didactic purposes, in this case, the pair of angles to be simultaneously measured to determine the angular position are read accordingly where the moved pole 16 of the outer sphere intersects with at least one of the first and second plurality of inner surface circumferential markings 20, 22.

Continuing to refer to FIG. 10, it is demonstrated that the plurality of outer surface circumferential markings 14 may be oriented substantially parallel to one another. It is also demonstrated that the first plurality of inner surface circumferential markings 20 and the second plurality of inner surface circumferential markings 22 may be oriented substantially orthogonal to each other. The skilled artisan may note that the orthogonal orientation of the first and second plurality of inner surface circumferential markings may form a Cartesian-like grid adapted to be over a spherical rather than a planar surface.

The angle to be defined using the device 10 according to an embodiment of the present invention illustrated in FIG. 10 is labeled as 52. The point that represents the angular measurement of the angle 52 is the point in space 54.

Figure 11:
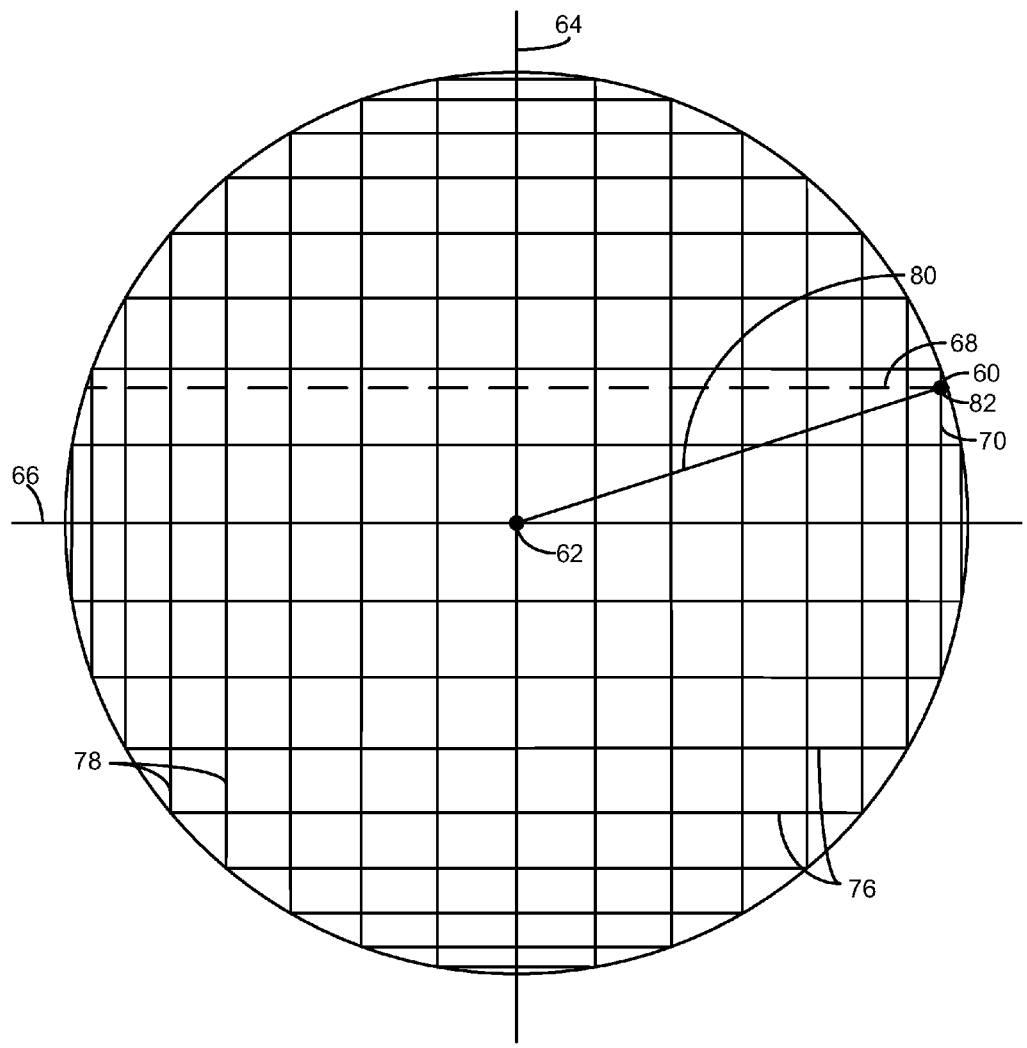
FIG. 11 is an illustration of use of a three-dimensional coordinate system to measure a three-dimensional angle and trajectory.
Figure 12:
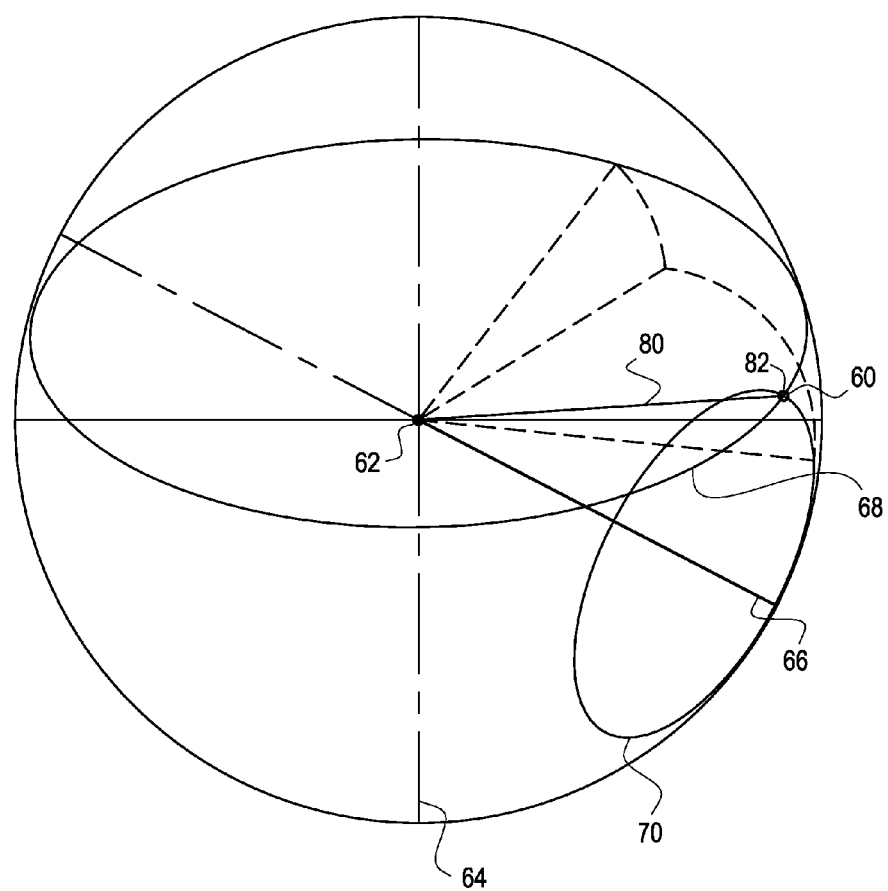
FIG. 12 is a three-dimensional view of the illustration of FIG. 11 to depict use of the three-dimensional coordinate system to measure the three-dimensional angle and trajectory.

Referring now to FIGS. 11 and 12, a method of defining the position and trajectory of an object in space 60 with respect to a point in space 62 will be discussed. The method may include defining a first straight axis 64 and a second straight axis 66 through the point in space 62. The first straight axis 64 and the second straight axis 66 may be oriented substantially perpendicular to each other. The method may further include defining a first circle shaped axis 68 through the object in space 60. The geometric center of the first circle shaped axis 68 may intersect with the first straight axis 64. A second circle shaped axis 70 may also be defined through the object in space 60. The geometric center of the second circle shaped axis 70 may intersect the second straight axis 66. The first circle shaped axis 68 and the second circle shaped axis 70 may be oriented substantially perpendicular to one another.

Referring now more particularly to FIG. 12, additional details of embodiments of the present invention are now described. The method may also include defining a sphere distance from the object in space 60 to the point in space 62, and defining a sphere 74 having a radius 76 that is substantially similar to the sphere distance. The method may further include defining a first set of measurement markers 76 along the sphere 74 and a second set of measurement markers 78 along the sphere. The first set of measurement markers 76 and the second set of measurement markers 78 may be oriented substantially perpendicular to each other. The first set of measurement markers 76 may illustratively be substantially parallel to the first circle shaped axis 68, and the second set of measurement markers 78 may be substantially parallel to the second circle shaped axis 70. Additionally, the first circle shaped axis 68 may be included in the first set of measurement markers 76, and the second circle shaped axis 70 may be included in the second set of measurement markers 78.

A line 80 may be defined, extending from the point in space 62 to the object in space 60. The angular position of the object in space 60 with respect to the point in space 62 may be determined by defining the intersection 82 of at least one of the first set of measurement markers 76 (illustrated in FIG. 11) and at least one of the second set of measurement markers 78 (also illustrated in FIG. 11). One of the points of intersection of the first and second circle shaped axes 68, 70 may form the intersection 82. The position of the object in space 60 with respect to the point in space 62 may be determined by locating the intersection 82 of at least one of the first set of measurement markers 76, at least one of the second set of measurement markers 78, and the line 80 defined from the point in space 62 to the object in space 60.

An angular position, as used herein, is a directional position. In other words, North, South, East, West, twenty degrees North of East, etc., are all angular, or directional, positions, that may be expressed using one or more angles (degrees, radians, etc.) and/or directional identifiers (North, South, East, West, etc.). A position, on the other hand, as used herein is some distance and direction from a given reference point, such as coordinates in a coordinate system. The coordinates may be expressed using numerical units (as in the Cartesian system), a distance and an angular direction (as in the polar system), or a combination thereof (as in the cylindrical system). Referring now more particularly to FIG. 11, for simplification purposes, the method may also include the orthogonal representation of the tridimensional method in a bidimensional grid where the object in space 60 with respect to a point in space 62 can be easily measured as demonstrated by the full representation of the three dimensional FIG. 12 by the two dimensional FIG. 11.

Figure 13A:
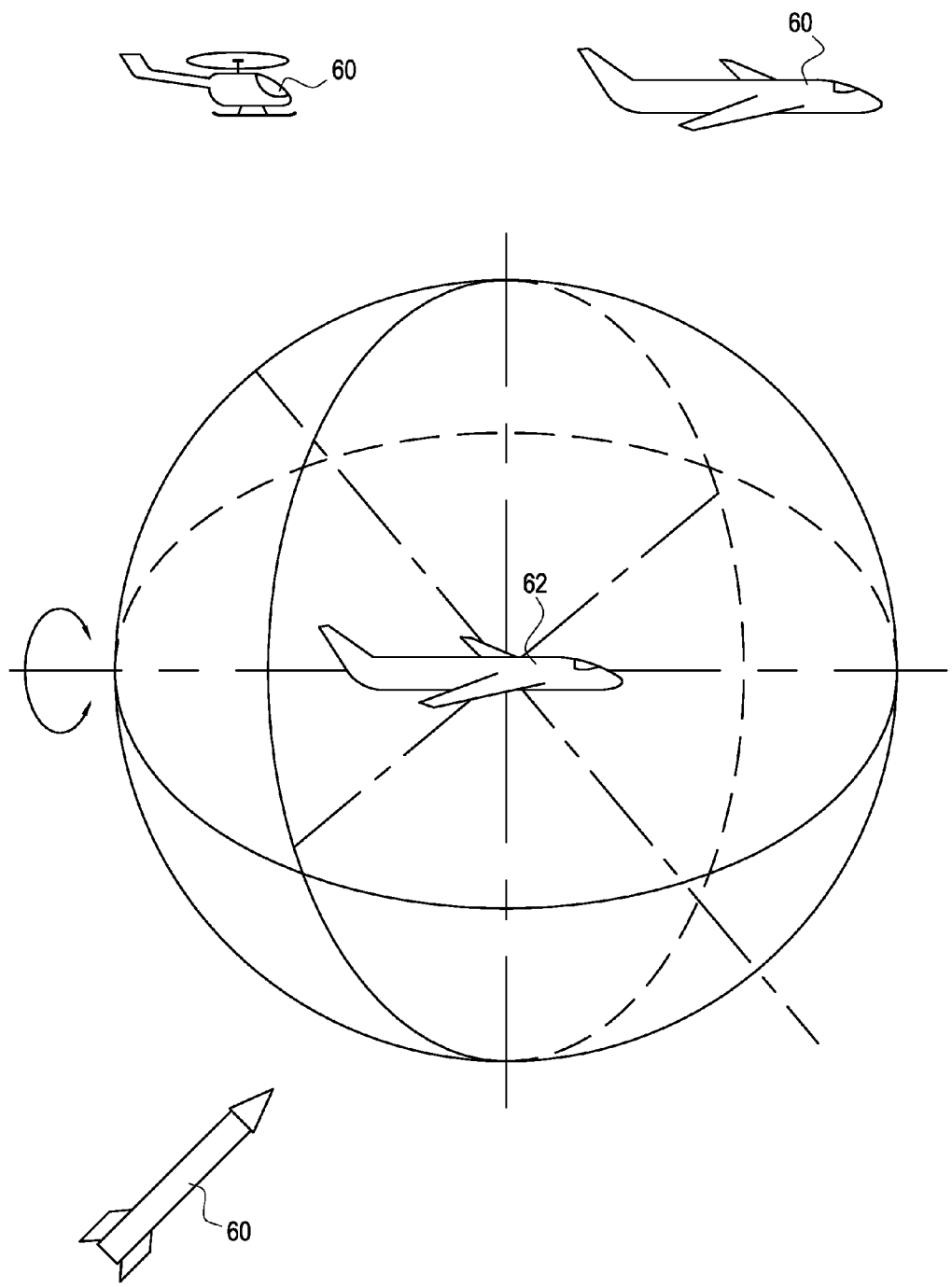
FIG. 13A is an environmental view of an embodiment of the device illustrated in FIG. 1 being used to measure and angle and trajectory of multiple objects in space with respect to an aircraft.
Figure 13B:
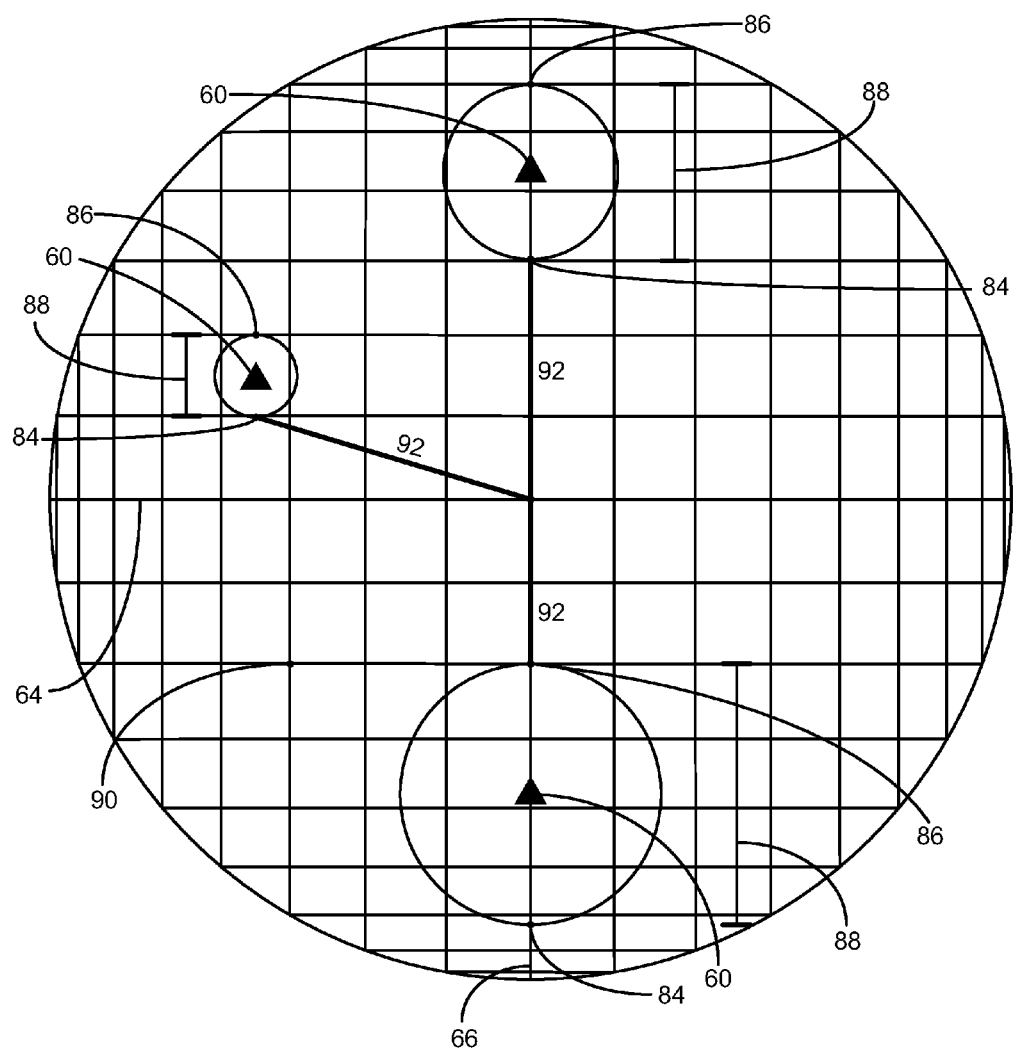
FIG. 13B is an elevation view of the device being used in FIG. 13A as it would appear from the perspective of a pilot within the aircraft.

Referring now to FIGS. 13A-B, a method of finding the trajectories of an object or objects in space 60 with respect to a point in space 62 will now be discussed. FIG. 13A depicts a typical environment for the use of a device 10 according to an embodiment of the present invention in an aircraft to detect the positions and trajectories of objects in space 60. The point in space 62 may represent a second object in space, as depicted by the aircraft in FIG. 13A. The second object in space will be discussed in greater detail below. The objects in space 60 for which the positions and trajectories are to be determined with respect to the aircraft at the point in space 62 are represented in FIG. 13A by another aircraft, a helicopter, and a missile. These may, for example, be typical objects that an aircraft might encounter, but the device 10 of an embodiment of the present invention may be used to find the position or trajectory of any object icy space 60 with respect to a point in space 62, and is not intended to be limited to the objects described in this example. As perhaps best illustrated in FIG. 13A, the device 10 according to an embodiment of the present invention advantageously allows for the identification of the position and trajectory of multiple objects 60 with respect to the object in space.

Referring now to FIG. 13B, an elevation view is presented of the device 10 according to an embodiment of the present invention being used in FIG. 13A as it would appear from the perspective of a pilot, in the case where the device is used in connection with an aircraft, within the aircraft at the point in space 62. The angular trajectory of the objects in space 60 with respect to the point in space 62 may be determined by locating a first intersection 84 of at least one of the first set of measurement markers 76 with at least one of the second set of measurement markers 78 with respect to a second intersection 86 of at least one of the first set of measurement markers 76 with at least one of the second set of measurement markers 78. The trajectory of the object in space 60 with respect to the point in space 62 may be determined by calculating a distance 88 traveled between the first intersection 84 and the second intersection 86 over a period of time. This distance 88 may be readily provided by a marking on the device 10 according to an embodiment of the present invention, or may be provided using a computer calculation, i.e., as an output from a computer device via an interface, as will be discussed in greater detail below.

The angular trajectory, as used herein, is the rate of angular change of an object's position. That is, the change in angular position over the time it takes to make that change is the angular trajectory. The trajectory, as used herein, on the other hand, is the rate of positional change in a direction to describe a pathway. In other words, the speed of an object and its angular trajectory defines its trajectory.

The first and second set of measurement markers 76, 78 may represent angular values. More particularly, the first and second set of measurement markers 76, 78 may represent ten-degree increments of angular values. The angular values of the first and second set of measurement markers 76, 78 may additionally be in any increment or any set of values, but ten-degree increments may be most readily recognized and accepted increments for one reading the values of the first and second set of measurement markers 76, 78.

In the method described above, the point in space 62 may additionally be defined as a cardinal point 90. The cardinal point 90 may also be defined as a zero value. The cardinal point 90 need not, however, be a zero value, and may be manipulable. The first set of measurement markers 76 may be centered about the first straight axis 64. The second set of measurement markers 78 may be centered about the second straight axis 66. This may allow for the first and second sets of measurement markers 76, 78, to be centered about the cardinal point 90.

Figure 14:
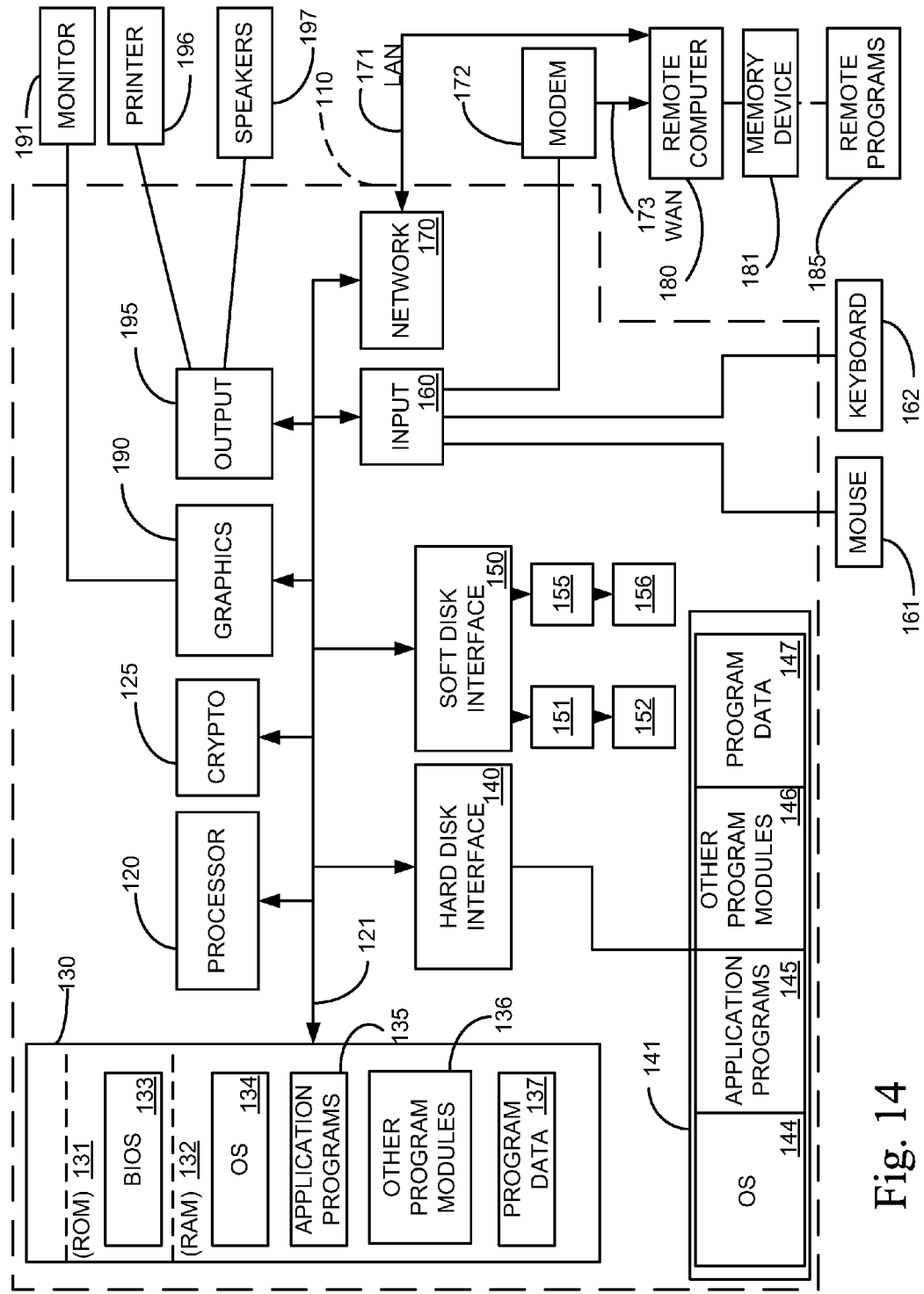
FIG. 14 is a block diagram of a model computing device that may be used with a device for defining an angle to be measured according to an embodiment of the present invention.

The point in space 62, as mentioned above, may also represent a second object in space. The second object in space, like the point in space 62, may be oriented with respect to the cardinal point 90. The orientation of the second object in space with respect to the cardinal point 90 may be determined by locating an intersection of at least one of the first set of measurement markers 76 and at least one of the second set of measurement markers 78 with an observed axis 92. The observed axis 92 may be defined as a perceived length of the line 80 (see FIGS. 11 and 12) extending from the point in space 62 to the object in space 60. On FIG. 13B the intersection of the first and second straight axis may represent the position of the aircraft 62. The orientation of the second object in space 62 and the length of the observed axis 92 may be calculated using a computer 110 as illustrated in FIG. 14. The computer 110 and its usefulness in the present invention are described in greater detail below. FIG. 13B represents the angular position and trajectory of objects in space 60 in a two dimensional display as the frontal and rear perspective for the pilot of the aircraft. For clarifying purposes, objects on the rear and frontal perspective may be represented differently on the same display, thus providing a full sphere shaped perspective on a bidimensional display.

One or more of the aspects of the present invention may be performed on a computing device. Of course, the angular value point of (0,0) may represent the trajectory of the location of the cockpit of the aircraft. The computer may also show the cardinal point 90 as the desired position of the aircraft. Accordingly, the pilot need only direct the aircraft to intersect the cardinal point 90 with the angular value point (0,0) to travel along a desired trajectory. Advantageously, particularly in the case of combat or emergency situations, the present invention may be used to assist the pilot by presenting desired trajectories to follow. More specifically, the steps of defining the first straight axis 64 and the second straight axis 66, defining the first circle shaped axis 68 and the second circle shaped axis 70, defining the sphere distance, defining the sphere 74, determining the angular position, the position, the angular trajectory and the trajectory of the object in space 60 with respect to the point in space 62 may be carried out using a computer 110 (FIG. 14). In other words, the method according to an embodiment of the present invention is tied to a machine or apparatus such as a computing device. The skilled artisan will note that a computing device may be understood to be any device having a processor, memory unit, input, and output. This may include, but is not intended to be limited to, cellular phones, smart phones, tablet computers, laptop computers, desktop computers, personal digital assistants, etc. FIG. 14 illustrates a model computing device in the form of a computer 110, which is capable of performing one or more computer-implemented steps in practicing the method aspects of the present invention. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 14 illustrates an operating system (OS) 134, application programs 135, other program modules 136, and program data 137.

The computer 110 may also include other removable/non-removable, volatile/nonvolatile computer storage media. By way of example only, FIG. 14 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives, and their associated computer storage media discussed above and illustrated in FIG. 14, provide storage of computer readable instructions, data structures, program modules and other data for the computer 110. In FIG. 14, for example, hard disk drive 141 is illustrated as storing an OS 144, application programs 145, other program modules 146, and program data 147. Note that these components can either be the same as or different from OS 134, application programs 135, other program modules 136, and program data 137. The OS 144, application programs 145, other program modules 146, and program data 147 are given different numbers here to illustrate that, at a minimum, they may be different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 14. The logical connections depicted in FIG. 14 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 14 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

A skilled artisan will note that, while any and all of these devices may be computer-based, each individual device need not necessarily be computer based. Further, the aforementioned devices may be in communication with each other by any method in the electronic arts known to be useful in facilitating electronic communication, such as a metallic wire, an optic cable, a wireless connection, a network, etc. Further, the skilled artisan will appreciate that any or all of the aforementioned devices may be included together as a single unit within a computing system, such as on a server or any type of personal computer. These are not comprehensive lists, and many additional embodiments suitable for carrying out the goals, features, and objectives of the present invention, which are meant to be included herein.

Figure 15:
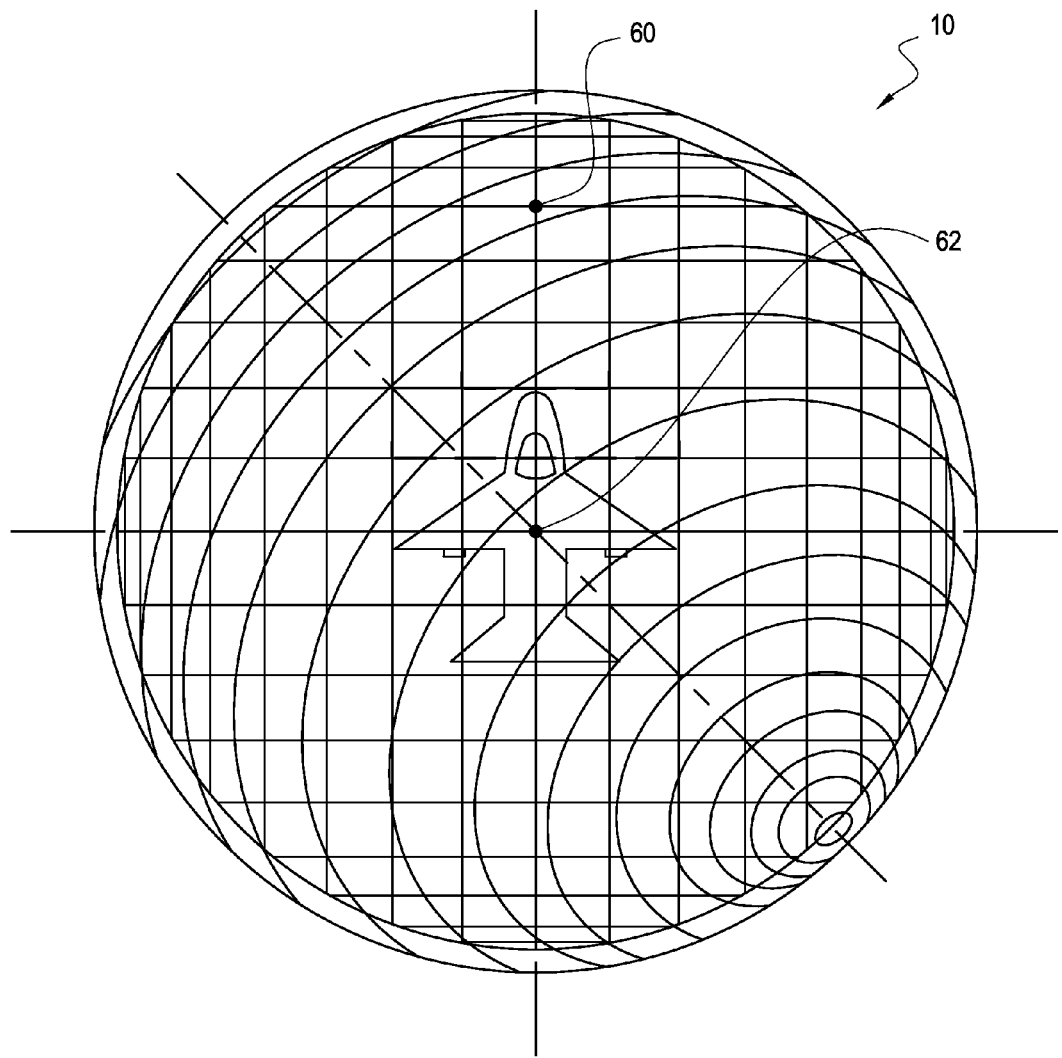
FIG. 15 is a perspective view of a device for defining an angle to be measured according to an embodiment of the present invention and showing various capable measurements with respect to an aircraft.

Referring now to FIG. 15, an embodiment of the device 10 and method for using the device and the method for defining an angular value, according to the present invention is shown in use with respect to an aircraft and, more particularly, with respect to a vantage point of a pilot within the aircraft. The cockpit of the aircraft may be defined as the origin, or point in space 62. By locating the cockpit as the point in space 62, and an object in space 60 as the desired trajectory, the pilot may be constantly positioned at the origin even if the aircraft moves. This is advantageous to the pilot, as he or she may be able to more readily recognize the angular position of the cockpit with respect to the desired trajectory, with respect to an object in space 60 when using the device 10 according to an embodiment of the present invention, particularly in an embodiment that includes a computing device 110 in the cockpit. Referring to the device shown on FIG. 15, its mechanical embodiment may be similar to FIG. 1. If positioned horizontally, the pilot reads the instrument using the top viewed painted plane on the pole of the external sphere. If placed vertically, the pilot reads the instrument using the rear viewed aircraft painted also on the pole of the external sphere. Of course, in this embodiment the inner sphere tends to keep its pole vertical. An observer placed on the point in space 62, in this case the pilot, may see all markings as equally spread along the spherical grid in a near-Cartesian manner. An orthogonal view, however, may show smaller distances among parallel markings due to the curvature of the sphere, as demonstrated in previous figures (most notably FIG. 5A). Of course, defining a location of an object's angular position may also be achieved by placing a radar, sonar or camera on the point in space 62, which may substantially reduce human error.

The device 10 according to an embodiment of the present invention may be superimposed onto video recorded by a camera, which may be advantageous to military as well as law enforcement, for example, on a police patrol car. Alternately, and with reference to FIG. 16A, an elevated view of the Cartesian-like grid of the device 10 may be adapted for use in a scope used in connection with firearms. This may be advantageous for both firing accuracy and reconnaissance applications. When superimposed on video or photographs, Cartesian-like grid of the device 10 may be used to verify legal evidence. For example, the Cartesian-like grid of the device may be superimposed on a surveillance photograph of a crime scene that involves a shooting to determine, for example, a position of the shooter, a trajectory of a bullet that was shot, a position of a victim, or countless other angular values that may be necessary in order to solve a crime. Such verification may be provided by the device 10 because of its ability to provide angular speed and angular trajectory of moving objects, the speed and trajectory of those objects, the distance between those objects, and the angular direction in which the objects (such as guns or bullets) were aimed.

Figure 16A:
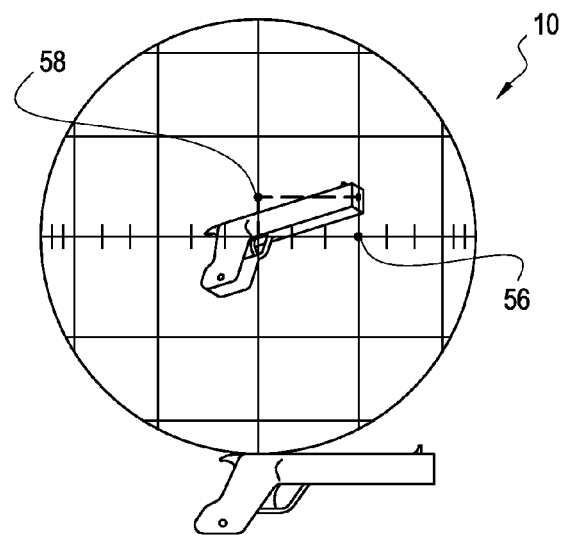
FIG. 16A is a view through a scope of an object using an embodiment of the device illustrated in FIG. 1 to determine a three-dimensional angular measurement of the object.

In FIG. 16A, the barrel of a pistol is depicted. It may be possible to know the model of the pistol from, for example, a catalog, or other known sources and, therefore, the length specifications of the pistol may be known. Additionally, the distance from the scope or camera to the barrel of the pistol can also be known by using focus distance measuring programs. Therefore, the radius of the device 10 according to an embodiment of the present invention in the scope or camera may be changed by the user to match the length of the barrel automatically with the use of a focus distance measuring program, or manually. In this particular example, angular position of the aim of the pistol can be determined by referring to the markings on the device. More specifically, a line drawn from an end of the barrel of the pistol to the horizontal axis of the Cartesian-like grid of the device 10 intersects with a particular marking (in this case, 30 degrees) thereby providing a user with an angular measurement of a direction that the pistol is aimed.

Figure 16B:
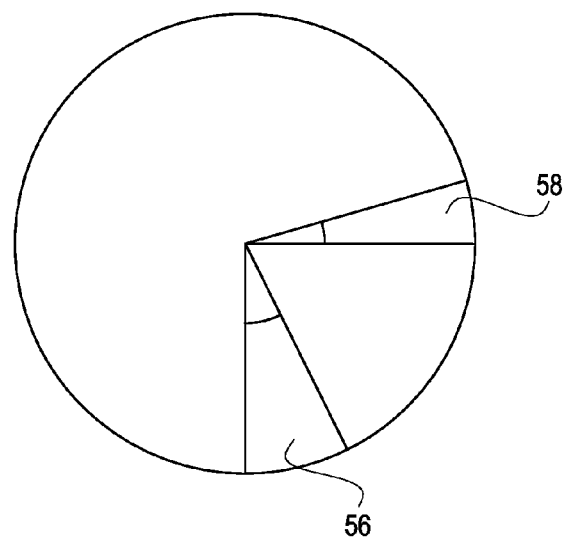
FIG. 16B is an illustration showing angles of the object being viewed through the scope in FIG. 16A.

This value may also be referred to as the first angular value and is represented on FIG. 16B. More particularly, FIG. 16B depicts a polar representation of the angular values of the pistol depicted in FIG. 16A. In other words, the first angular value 56 is depicted in FIG. 16A as the horizontal angular distance from the end of the barrel of the pistol to a vertical axis of rotation, and as a polar representation in FIG. 16B. Similarly, the second angular value 58 is depicted in FIG. 16B as the vertical angular distance from the end of the barrel of the pistol to a horizontal axis of rotation, and as a polar representation in FIG. 16B.

FIG. 16A also shows that the barrel of the pistol is aimed fifteen degrees up with respect to the observer's line of sight. The device 10 can be used in connection with any video recording during which guns were aimed. Additionally, the device 10 according to an embodiment of the present invention in a scope or camera may have military applications including, but not limited to, measuring the aiming angle of cannons, missiles, or tanks from photographs, videos, or live situations.

Figure 17A:
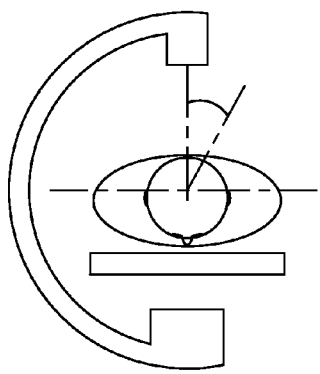
FIGS. 17A-F are various views of embodiments of a device for defining an angle to be measured according to an embodiment of the present invention and being used in connection with medical treatment.
Figure 17B:
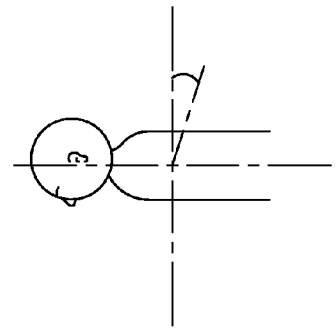
Figure 17C:
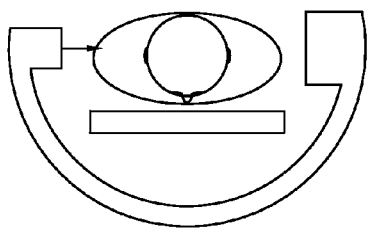
Figure 17D:
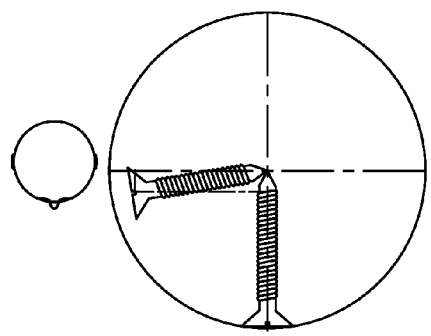
Figure 17E:
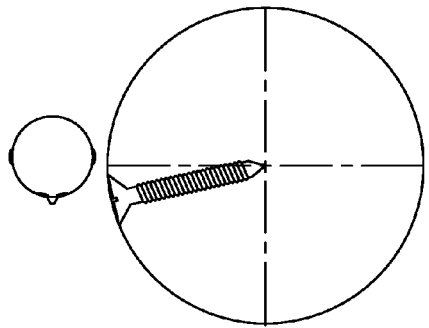
Figure 17F:
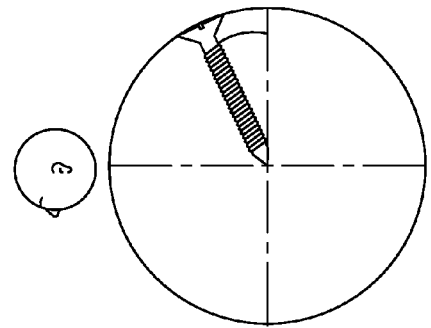

Referring now to FIGS. 17A-F, use of an embodiment of the present invention in surgery will now be discussed. Particularly, as shown FIGS. 17D-F, the device 10 according to an embodiment of the present invention may be superimposed onto any kind of image in order to achieve three-dimensional angular measurement. Three-dimensional angular measurement may be achieved by superimposing the device 10 according to an embodiment of the present invention onto medical images that may be obtained by an x-ray machine, also known as a fluoroscope, or any other medical imaging device, such as a magnetic resonance imaging (MRI) machine, or a computed tomography (CT) scan machine, as illustrated in FIGS. 17A-C (FIGS. 17A-C correspond to the medical images illustrated in FIGS. D-F, respectively). The medical images taken of a patient during surgery may be used to measure the three-dimensional angular position of an implant, in this case, a screw, along an implantation trajectory through the body. Given that, during the implant of a prosthesis, the surgeon needs to know two perpendicularly arranged angles with respect to a patient's cephalocaudal and mediolateral axes, superimposition of the Cartesian-like grid of the device 10 may provide the simultaneous graph of both angles with respect to the trajectory as seen on the medical image. In order to achieve the most accurate angular measurement of the two needed angles, the radius of the device 10 according to an embodiment of the present invention, when superimposed on the image, is substantially equivalent to the maximal length of the screw when the screw is placed along the radius, as seen in FIG. 17F. Also in FIG. 17D, a second, identical screw oriented along the radius of the device 10 according to an embodiment of the present invention in an image to be taken in order to show the first screw having the proper angular measurements while having the second screw as a reference.

The Cartesian-like grid of the device 10 may be positioned in parallel fashion with the mediolateral axis and cephalocaudal axis of the body. This carries an advantage, because, when using standard methods, the surgeon has to capture a mediolateral medical image (FIGS. 17C and 17F) to figure out the cephalocaudal angle, while a posteroanterior medical image (FIGS. 17A and 17E) may be captured to merely guess the lateral angle, because a useful cephalocaudal radiograph is not possible. Of course, the standard method may be less accurate because both needed angles are not simultaneously captured. This may double the number of medical images needed, doubling the radiation for the patient and for all the medical personnel within an operating room. Using the method described above instead of the standard method, however, may reduce radiation exposure for patient and personnel by potentially requiring only one medical image.

Although not pictured, design and construction industries may also benefit from the device 10 according to an embodiment of the present invention by measuring angular positioning of components of diverse objects such as houses, furniture, and cars. Countless other objects may come to mind, and are meant to be included as measureable by the device 10 according to an embodiment of the present invention. The device 10 according to an embodiment of the present invention may be used in two-dimensional as well as three-dimensional spaces, and may transform three-dimensional angular values and their three-dimensional visual form into two-dimensional angular values and their two-dimensional visual form and vice versa. This is achieved by using a single defining point to represent both defining angles on the device 10 according to an embodiment of the present invention.

Figure 18:
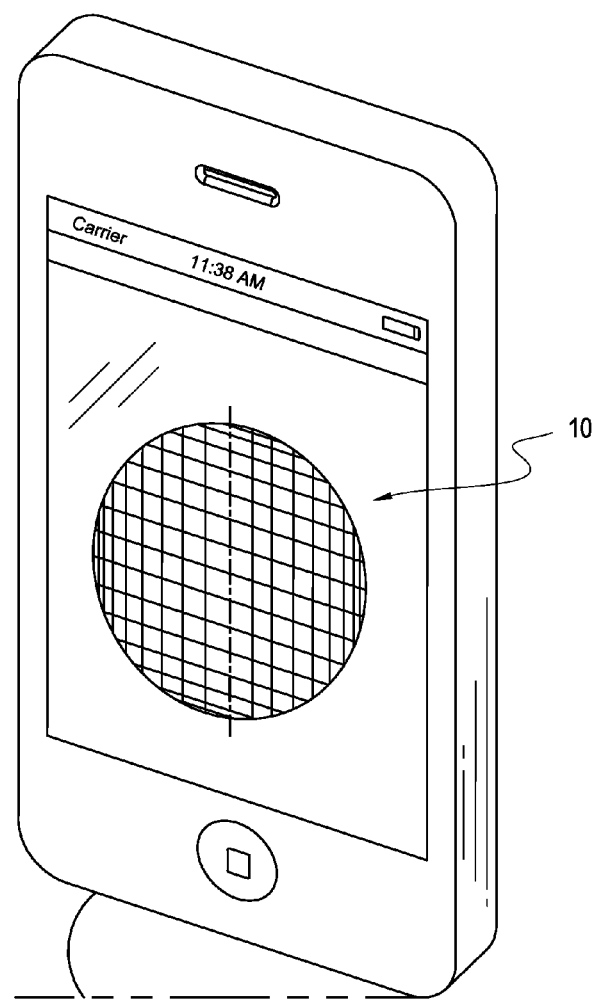
FIG. 18 is a an illustration of use of a device for defining an angle to be measured according to an embodiment of the present invention and being used in connection with a smartphone.

FIG. 18 shows another embodiment according to the present invention of the device 10 in use as an application (app) displayed on the screen of a smartphone. Given that a smartphone may use internal accelerometers to determine the position of the smartphone with respect with a vertical axis, the use of accelerometers in order to determine the inclination angles of the smartphone can be displayed on the screen within the a grid of the device 10 according to an embodiment of the present invention. In this embodiment, the addition of a laser pointer to the smartphone may be of great use, particularly for designers, blacksmiths, carpenters, and construction workers. Accordingly, any device with integrated accelerometers that displays the grid of the device 10 according to an embodiment of the present invention on a screen the inclination of an axis of the device is intended to be included within the scope and spirit of the present invention.

Figure 19A:
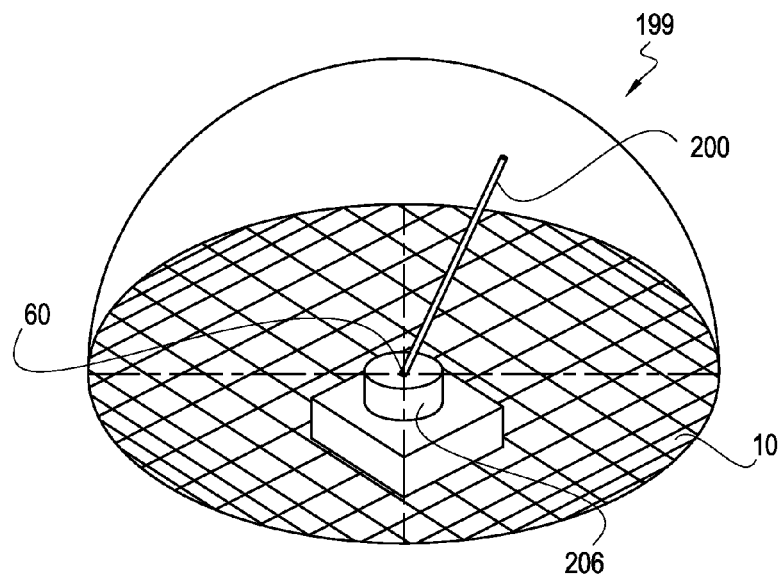
FIG. 19A is a perspective view of a device for defining an angle to be measured according to an embodiment of the present invention and being used in connection with a vector sensor.
Figure 19B:
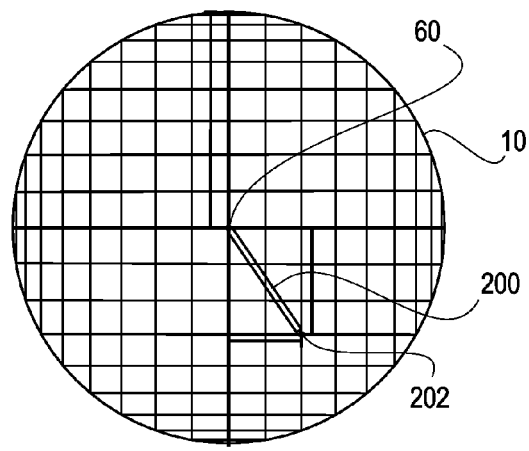
FIG. 19B is a top plan view of the device illustrated in FIG. 19A and showing a coordinate system used to define the angle to be measured.

Referring now to FIGS. 19A and B, a vector sensor 199 that may use the device 10 according to an embodiment of the present invention will now be discussed. The vector sensor shown 199 in FIG. 19A uses the Cartesian-like grid of the device 10 according to an embodiment of the present invention as shown in FIG. 19B to display the three-dimensional trajectory of a vector 202. A preferred embodiment of such a vector sensor 199 includes an object (also known as an object of study) 200 that interacts with physical forces that may have a vector 202. The object 200 has a selected axis of study 204 as shown on FIG. 19A, along which a point in space 60 is depicted in FIG. 19B. The object 200 may preferably be flexible, so that the object may move with the physical force. The vector of the physical force may be measured over time by superimposing the image of the Cartesian-like grid of the device 10 according to an embodiment of the present invention centered on the selected axis of study. The length of the radius of the Cartesian-like grid may be manipulated to have the same, or substantially similar, length of the object 200 in order to achieve an accurate angular position coordinate measurement of the object with respect to the point in space 60. This embodiment of the device 10 in a vector sensor 199, due to its elegant simplicity, may be used to study a vector field that contains many different vectors at the same time, such as the crash of a hydraulic wave over a solid structure. Many objects of study may be located over the vector field, and may be filmed by at least one camera while the vector field is active (i.e., forces acting upon the vector sensor within the vector field). This embodiment of the device 10 of the present invention provides a way to accurately and simultaneously measure changes in trajectory for multiple axes of study, providing the ability to study a full vector field. A camera 206 may alternately be attached at the point in space 60, at one of the ends of the object of study, and the grid of the device 10 according to an embodiment of the present invention may be superimposed directly onto an image produced by the camera in order to measure vector angular position coordinates.

Referring now to FIGS. 20A-C, the device 10 according to an alternate embodiment of the present invention is illustrated. The present invention may be used in a Micro-Electro-Mechanical System (MEMS). This embodiment may be accomplished by integrating mechanical and electronic arrays on a common substrate using micro manufacturing technology. This particular embodiment of the device 10 of the present invention includes a MEMS that may have at least two gravity sensors that may be orthogonally oriented on parallel planes. The gravity sensors may be capacitors, which may include a central conductive plaque that is in proximity with external conductive plaques at every side. The capacitance variations may be registered independently amongst each of the external plaques. Given that the external plaques may change proximity with respect to the central conductive plaque, driven by the gravity force to the inclination of the parallel planes that, in the case of a MEMS, are the substrate where the MEMS is included, the capacitance amongst the plaques also varies. That is, the first capacitor may measure the X angle by the capacitance difference between the capacitance of a first central plaque and its external plaques. In the same manner, the second capacitor may measure the Y angle by the capacitance difference between the capacitance of the second central plaque with its external plaques.

In the embodiment shown in FIGS. 20A-C, it is possible to measure the inclination angles of the MEMS using only a couple of capacitors. Standard technology may require three capacitors located on orthogonally arranged substrates. Another advantage of this particular arrangement is that it is possible for the capacitors to also change capacitance due to inertial and centrifugal forces, enabling measurement of capacitance changes due to inclination, vibration and inertial forces. Many additional embodiments and modifications of the device 10 according to the embodiment of the present invention shown in FIGS. 20A-C may come to mind of one skilled in the art, and are intended to be included within the scope and spirit of the present invention. For instance, at least two capacitors may be unevenly oriented. In this case, the internal plaques may able to get closer to the external plaques due to the torsion of the internal plaque caused by gravity, vibration, and inertial forces. Such torsion may produce capacitance differences, and torsion forces may differ with the orientation of each capacitor.

Figure 21A:
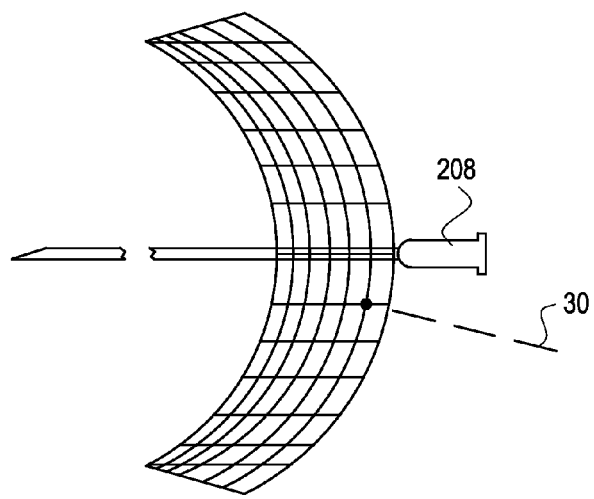
FIGS. 21A-B are elevation views of a device for defining an angle to be measured according to an embodiment of the present invention and being used to determine a trajectory of an object.
Figure 21B:
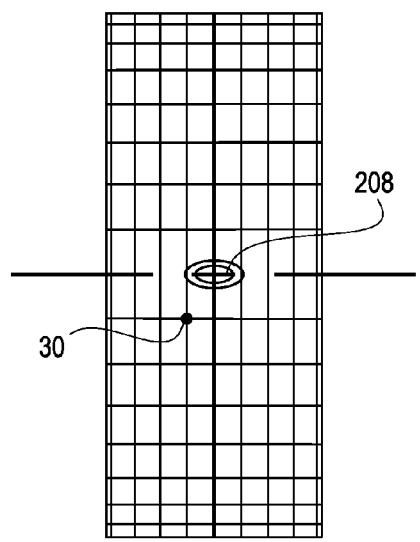

Referring now to FIGS. 21A-B, an alternate embodiment of the device 10 having a mounting receiving member 36 will now be discussed. Specifically, FIG. 21A illustrates partial employment of the spheres of the device 10 according to an embodiment of the present invention in order to measure angular values. In this embodiment, the device 10 works as a three-dimensional inclinometer given that the vertical axis is detected by the measurement fluid 30. The device 10 may be attached to a tool such as a screwdriver, an awl, or a laser. The device 10 may also be attached to the handle of a needle 208 as shown in FIG. 21A. The skilled artisan will note that the needle in this embodiment may be inserted through a small tunnel that is coincident with the vertical axis when the device 10 is fully vertical. The tunnel is shown going into the page in the oblique view illustrated in FIG. 21B. Additionally, the cardinal point and the central point may be coincident the needle 208. Therefore, as illustrated in FIG. 21A the modified device 10 may resemble a partial torpid-shaped plane which may provide a better measurement and understanding of the trajectory of the needle 208, or any other mounted member, through a body.

The device 10 according to the embodiment of the present invention shown in FIGS. 21A-B may also be used to assist medical professionals that insert needles for therapeutic or biopsy applications. In those cases, the assistance of medical imaging guidance systems is often needed. Because the present invention provides a continuous trajectory measurement, a smaller number of medical images may be necessary to maintain a correct trajectory. Of course, many additional embodiments, variations, and modifications may readily come to mind of one skilled in the art and are intended to be included within the scope and spirit of the present invention. For instance, a dosed partial ellipsoid shaped plane may be utilized instead of the partial toroid shape illustrated.

Figure 22A:
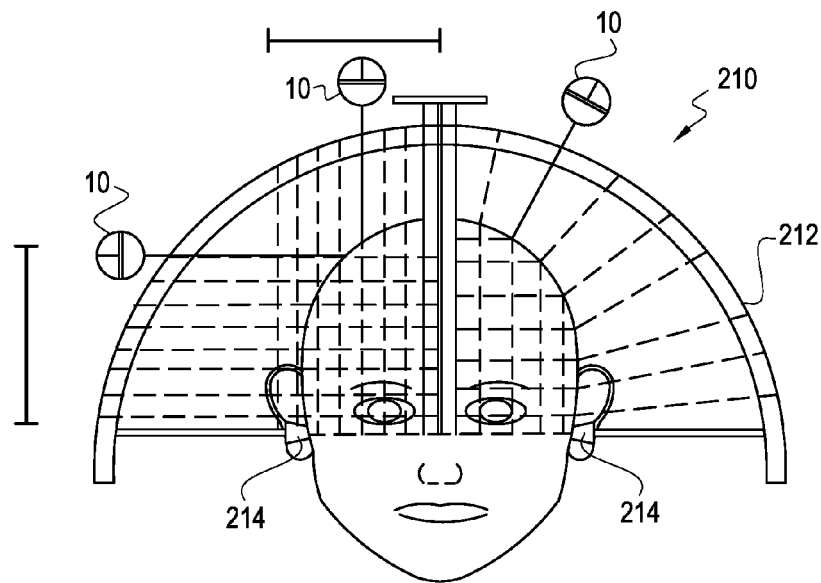
FIGS. 22A-B are elevation views of a device for defining an angle according to an embodiment of the present invention and being used in connection with determining position and trajectory of surgical tools.
Figure 22B:
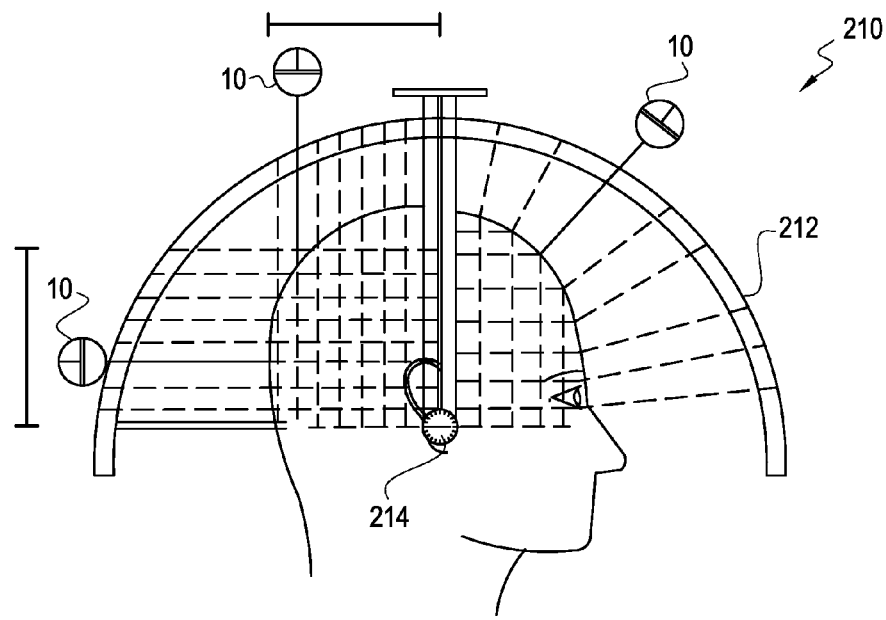

Referring now to FIGS. 22A-B, another surgical application of the device 10 according to an embodiment of the present invention is illustrated. A device for neurosurgery measurement 210 using the present invention is shown having an arc 212 attached to the head with a pair of external ear canal plugs 214 for stabilization. The arc may include markings that may be analogous to the first and second plurality of inner sphere circumferential markings of the device 10. A central point may be located in the middle of the line that intersects both plugs inside the head of a patient. The arc 212 as shown in FIGS. 22A-B may also include length measurement markings that may allow a neurosurgeon to measure lengths in inches as well as in centimeters for surgery planning and localization. This provides an air ling platform for both the angular and length markings that enable the attachment of pointers, such as an embodiment of the device 10 having a mounting member attached thereto. It may be noted that in FIGS. 22A-B, the position of the arc 212 is shown to be coincident with a main circular line. Once the length and/or angular measurement is achieved, the point on the skin where the pointer aims may be marked with some marker.

By using the device 10 according to the embodiment having the mounting member attached thereto as shown, the angles of inclination detected by the device 10 having the mounting member attached thereto may be recorded. Once the arc 212 is withdrawn from the head, a surgeon may be able maintain an accurate aim simply by replicating the measurement of the device 10 on the mounting member as it was when attached to the device 10 according to the embodiment of the present invention having a neurosurgery arc. This is particularly advantageous with respect to the state of the art because the arc 212 can be removed from the head once the patient is positioned on the operating table while maintaining a surgical trajectory. The arc may be placed on the head while the patient is asleep under anesthesia, while other arcs may need to be positioned with the patient awake prior to surgery. Additionally, other arcs may require medical imaging such as an Magnetic Resonance Image (MRI) or a Computed Tomography (CT) Scan while attached to the head, while the device 10 according to the embodiment of the present invention having a neurosurgery arc may advantageously reduce the need for medical imaging.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A device for defining an angle to be measured, the device comprising:
   an outer sphere having a plurality of outer surface circumferential markings positioned on a surface portion thereof that are centered about an outer sphere axis;
   an inner sphere carried by the outer sphere and having a first and second plurality of inner surface circumferential markings positioned on a surface portion thereof, the first plurality of inner surface circumferential markings being centered about a first inner sphere axis and the second plurality of inner surface circumferential markings being centered about a second inner sphere axis, wherein the first inner sphere axis and the second inner sphere axis are oriented substantially perpendicular to one other;
   an outer sphere fluid carried by the outer sphere; and
   a measurement fluid suspended in the outer sphere fluid exterior to the inner sphere;
   wherein the inner sphere is suspended in the outer sphere fluid;
   wherein the plurality of outer surface circumferential markings and the first and second plurality of inner surface circumferential markings represent angular values;
   wherein the angle to be measured is defined as a position of an intersection of one of the plurality of outer surface circumferential markings with at least one of the first and second plurality of inner surface circumferential markings.

2. A device according to claim 1 wherein the plurality of outer surface circumferential markings are oriented substantially parallel to one another.

3. A device according to claim 1 wherein the first plurality of inner surface circumferential markings and the second plurality of inner surface circumferential markings are oriented substantially orthogonal to each other.

4. A device according to claim 1 further comprising a cardinal point positioned on the outer surface portion of the outer sphere, the cardinal point representing a zero value.

5. A device according to claim 1 further comprising an inner sphere fluid carried by the inner sphere.

6. A device according to claim 5 wherein the inner sphere fluid and the outer sphere fluid have substantially similar densities.

7. A device according to claim 1 wherein the outer sphere is comprised of a substantially transparent material.

8. A device according to claim 1 wherein the outer surface further comprises a mounting receiving member to receive a mounting device.

9. A device according to claim 8 further comprising a cardinal point positioned on the outer surface portion of the outer sphere, the cardinal point representing a zero value; and wherein the mounting receiving member is positioned at the cardinal point.

10. A device according to claim 1 wherein the inner sphere includes a polar axis that is oriented substantially perpendicular to the first inner sphere axis and the second inner sphere axis.

11. A device for defining an angle to be measured, the device comprising:
    an outer sphere having a plurality of outer surface circumferential markings positioned on a surface portion thereof that are centered about an outer sphere axis, the outer sphere axis being defined as a pole, wherein the plurality of outer surface circumferential markings are oriented substantially parallel to one another;

an inner sphere carried by the outer sphere and having a first and second plurality of inner surface circumferential markings positioned on a surface portion thereof, the first plurality of inner surface circumferential markings being centered about a first inner sphere axis and the second plurality of inner surface circumferential markings being centered about a second inner sphere axis, wherein the first inner sphere axis and the second inner sphere axis are oriented substantially perpendicular to one other;

an outer sphere fluid carried by the outer sphere;

a measurement fluid suspended in the outer sphere fluid exterior to the inner sphere;

an inner sphere fluid carried by the inner sphere; and a cardinal point positioned on the outer surface portion of the outer sphere, the cardinal point representing a zero value;

wherein the inner sphere is suspended in the outer sphere fluid;

wherein the plurality of outer surface circumferential markings and the first and second plurality of inner surface circumferential markings represent angular values; and wherein the angle to be measured is defined as a position of an intersection of one of the plurality of outer surface circumferential markings with at least one of the first and second plurality of inner surface circumferential markings.

12. A device according to claim 11 wherein the first plurality of inner surface circumferential markings and the second plurality of inner surface circumferential markings are oriented substantially orthogonal to each other.

13. A device according to claim 11 wherein the inner sphere fluid and the outer sphere fluid have substantially similar densities.

14. A device according to claim 11 wherein the outer sphere is comprised of a substantially transparent material.

15. A device according to claim 11 wherein the outer surface further comprises a mounting receiving to receive a mounting device.

16. A device according to claim 15 wherein the mounting receiving is positioned at the cardinal point.

17. A device according to claim 11 wherein the angle to be measured is further defined as a position of an intersection of the pole with at least one of the first and second plurality of inner surface markings.

18. A device according to claim 11 wherein the inner sphere is heavier on a portion thereof.

19. A device according to claim 11 wherein the inner sphere contains a set of at least three gyroscopes in order to maintain an orientation when the outer sphere is moved.

20. A method of measuring an angle using a device that comprises an outer sphere having a plurality of outer surface circumferential markings positioned on a surface portion thereof that are centered about an outer sphere axis, an inner sphere carried by the outer sphere and having a first and second plurality of inner surface circumferential markings positioned on a surface portion thereof, an outer sphere fluid carried by the outer sphere, and a measurement fluid suspended in the outer sphere fluid exterior to the inner sphere, the method comprising:

aligning a marking on the device that represents a zero value along a segment of the angle to be measured;

wherein the plurality of outer surface circumferential markings and the first and second plurality of inner surface circumferential markings represent angular values; and wherein the angle to be measured is defined as a position of an intersection of one of the plurality of outer surface circumferential markings with at least one of the first and second plurality of inner surface circumferential markings.

21. A method according to claim 20 wherein the plurality of outer surface circumferential markings are oriented substantially parallel to one another.

22. A method according to claim 20 wherein the first plurality of inner surface circumferential markings and the second plurality of inner surface circumferential markings are oriented substantially orthogonal to each other.

23. A method according to claim 20 wherein the device includes a cardinal point positioned on the outer surface portion of the outer sphere, the cardinal point representing a zero value.

24. A method according to claim 20 wherein the device further comprises an inner sphere fluid carried by the inner sphere.

25. A method according to claim 24 wherein the inner sphere fluid and the outer sphere fluid have substantially similar densities.

26. A method according to claim 20 wherein the outer sphere is comprised of a substantially transparent material.

27. A method according to claim 20 wherein the outer surface further comprises a mounting receiving member to receive a mounting device.

28. A method according to claim 27 wherein the device includes a cardinal point positioned on the outer surface portion of the outer sphere, the cardinal point representing a zero value; and wherein the mounting receiving member is positioned at the cardinal point.

29. A method of defining a position and a trajectory of an object in space with respect to a point in space, the method comprising:

defining a first straight axis and a second straight axis through the point in space, wherein the first straight axis and the second straight axis are oriented substantially perpendicular to each other;

defining a first circle shaped axis through the object in space, wherein the first circle shaped axis intersects its geometric center with the first straight axis;

defining a second circle shaped axis through the object in space, wherein the second circle shaped axis intersects its geometric center with the second straight axis;

wherein the first circle shaped axis and the second circle shaped axis are oriented substantially perpendicular to one another;

defining a sphere distance from the object in space to the point in space;

defining a sphere having a radius that is substantially similar to the sphere distance;

defining a first set of measurement markers along the sphere and a second set of measurement markers along the sphere, wherein the first set of measurement markers and the second set of measurement markers are oriented substantially perpendicular to each other;

defining a line extending from the point in space to the object in space;

wherein the angular position of the object in space with respect to the point in space is determined by locating the intersection of at least one of the first set of measurement markers and at least one of the second set of measurement markers;

wherein the position of the object in space with respect to the point in space is determined by locating the intersection of at least one of the first set of measurement markers, at least one of the second set of measurement markers, and the line defined from the point in space to the object in space;

wherein the angular trajectory of the object in space with respect to the point in space is determined by locating a first intersection of at least one of the first set of measurement markers with at least one of the second set of measurement markers with respect to a second intersection of at least one of the first set of measurement markers with at least one of the second set of measurement markers;

wherein the trajectory of the object in space with respect to the point in space is determined by calculating a distance traveled between the first intersection and the second intersection over a period of time;

wherein the steps of defining the first straight axis and the second straight axis, defining the first circle shaped axis and the second circle shaped axis, defining the sphere distance, defining the sphere, determining the angular position, the position, the angular trajectory and the trajectory of the object in space with respect to the point in space are carried out using a computer.

30. A method according to claim 29 wherein the first and second set of measurement markers represent angular values.

31. A method according to claim 29 wherein the point is space is defined as a cardinal point.

32. A method according to claim 31 where in the cardinal point is defined as a zero value.

33. A method according to claim 31 wherein the first and second sets of measurement markers are centered about the cardinal point.

34. A method according to claim 31 wherein the point in space represents a second object in space.

35. A method according to claim 34 wherein the second object in space is oriented with respect to the cardinal point.

36. A method according to claim 35 wherein the orientation of the second object in space with respect to the cardinal point is determined by locating the intersection of at least one of the first set of measurement markers and at least one of the second set of measurement markers with an observed axis, wherein the observed axis is defined as a perceived length of the line extending from the point in space to the object in space, and wherein the orientation of the second object in space and the length of the observed axis are calculated using a computer.

37. A method according to claim 29 wherein the first set of measurement markers are centered about the first straight axis, and wherein the second set of measurement markers are centered about the second straight axis.

* * * * *